US010272330B2

(12) United States Patent
Hussman et al.

(10) Patent No.: US 10,272,330 B2
(45) Date of Patent: *Apr. 30, 2019

(54) SYSTEM, METHOD AND HANDHELD CONTROLLER FOR MULTI-PLAYER GAMING

(71) Applicant: TimePlay Inc., Toronto (CA)

(72) Inventors: Jonathan Ira Hussman, Toronto (CA); Jon Hayes Snoddy, Pasadena, CA (US); John Andrew Race, Los Angeles, CA (US); Mark Rider, Ridgeville (CA)

(73) Assignee: TimePlay Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/662,766

(22) Filed: Jul. 28, 2017

(65) Prior Publication Data
US 2018/0021676 A1      Jan. 25, 2018

Related U.S. Application Data

(63) Continuation of application No. 14/161,197, filed on Jan. 22, 2014, now Pat. No. 9,751,009, which is a (Continued)

(51) Int. Cl.
*A63F 13/26* (2014.01)
*A63F 13/31* (2014.01)
(Continued)

(52) U.S. Cl.
CPC .............. *A63F 13/26* (2014.09); *A63F 13/12* (2013.01); *A63F 13/2145* (2014.09);
(Continued)

(58) Field of Classification Search
None
See application file for complete search history.

(56) References Cited

U.S. PATENT DOCUMENTS 4,445,187 A    4/1984   Best
4,477,069 A    10/1984  Crudgington, Jr.
(Continued)

FOREIGN PATENT DOCUMENTS

CA    2095820 A1   5/1992
DE    4221118 A1   1/1994
(Continued)

OTHER PUBLICATIONS

US 9,257,982 B2, 02/2016, Hutton (withdrawn)
(Continued)

*Primary Examiner* — Damon Pierce
(74) *Attorney, Agent, or Firm* — Bereskin & Parr LLP/S.E.N.C.R.L., s.r.l.

(57) ABSTRACT

Embodiments of the invention relate to systems and methods for multi-player gaming. Some embodiments relate to systems having an improved communications infrastructure and improved handheld game controllers, while other embodiments relate to improvements in handling large numbers of players in the multi-player game when played in a game arena with a single large display screen showing the multi-player game images. In one particular embodiment, a system is provided that has a game server controlling a display system to display the multi-player game on the large screen and a plurality of game controllers. Each game controller has a secondary display means for providing a secondary game display and input means for receiving player input. The system further comprises communication mans for enabling communication between the game server and each of the plurality of game controllers. The plurality of game controllers are located in proximity to the large display screen such that it is visible to game players manipulating the game controllers while playing the multi-player game.

19 Claims, 17 Drawing Sheets

Related U.S. Application Data continuation of application No. 12/638,813, filed on Dec. 15, 2009, now Pat. No. 8,951,124, which is a continuation of application No. 11/232,199, filed on Sep. 21, 2005, now abandoned.

(60) Provisional application No. 60/697,037, filed on Jul. 6, 2005, provisional application No. 60/611,945, filed on Sep. 21, 2004.

(51) Int. Cl.
| | |
|---|---|
| *A63F 13/2145* | (2014.01) |
| *A63F 13/843* | (2014.01) |
| *A63F 13/27* | (2014.01) |
| *A63F 13/30* | (2014.01) |
| *G07F 17/32* | (2006.01) |
| *B60K 6/365* | (2007.10) |
| *B60K 6/387* | (2007.10) |
| *B60K 6/40* | (2007.10) |
| *B60K 6/445* | (2007.10) |
| *F16H 3/72* | (2006.01) |
| *A63F 13/235* | (2014.01) |
| *A63F 13/35* | (2014.01) |
| *A63F 13/53* | (2014.01) |
| *A63F 13/24* | (2014.01) |
| *A63F 13/285* | (2014.01) |
| *B60K 1/02* | (2006.01) |
| *F16H 37/08* | (2006.01) |
| *F16H 37/10* | (2006.01) |

(52) U.S. Cl.
CPC ............ *A63F 13/235* (2014.09); *A63F 13/24* (2014.09); *A63F 13/27* (2014.09); *A63F 13/31* (2014.09); *A63F 13/35* (2014.09); *A63F 13/53* (2014.09); *A63F 13/843* (2014.09); *B60K 6/365* (2013.01); *B60K 6/387* (2013.01); *B60K 6/40* (2013.01); *B60K 6/445* (2013.01); *F16H 3/728* (2013.01); *G07F 17/32* (2013.01); *G07F 17/323* (2013.01); *G07F 17/3211* (2013.01); *G07F 17/3223* (2013.01); *G07F 17/3276* (2013.01); *A63F 13/285* (2014.09); *A63F 2300/407* (2013.01); *A63F 2300/50* (2013.01); *A63F 2300/8023* (2013.01); *B60K 1/02* (2013.01); *F16H 2037/0866* (2013.01); *F16H 2037/102* (2013.01); *F16H 2037/104* (2013.01); *F16H 2037/106* (2013.01); *F16H 2200/2007* (2013.01); *F16H 2200/2064* (2013.01); *Y02T 10/6239* (2013.01)

(56) References Cited

U.S. PATENT DOCUMENTS

| | | |
|---|---|---|
| 4,771,344 A | 9/1988 | Fallacaro et al. |
| 4,866,515 A | 9/1989 | Tagawa et al. |
| 4,974,252 A | 11/1990 | Osborne |
| 4,976,438 A | 12/1990 | Tashiro et al. |
| 5,213,555 A | 5/1993 | Hood et al. |
| 5,215,464 A | 6/1993 | Marshall et al. |
| 5,273,437 A | 12/1993 | Caldwell et al. |
| 5,297,802 A | 3/1994 | Pocock et al. |
| 5,465,384 A | 11/1995 | Bejan et al. |
| 5,480,158 A | 1/1996 | Schulze et al. |
| 5,498,002 A | 3/1996 | Gechter et al. |
| 5,517,320 A | 5/1996 | Schuler |
| 5,518,253 A | 5/1996 | Pocock et al. |
| 5,613,909 A | 3/1997 | Stelovsky et al. |
| 5,618,045 A | 4/1997 | Kagan et al. |
| 5,674,128 A | 10/1997 | Holch et al. |
| 5,702,305 A | 12/1997 | Norman et al. |
| 5,737,527 A | 4/1998 | Shiels et al. |
| 5,738,583 A | 4/1998 | Comas et al. |
| 5,759,101 A | 6/1998 | Von Kohorn |
| 5,801,754 A | 9/1998 | Ruybal et al. |
| 5,801,764 A | 9/1998 | Koizumi et al. |
| 5,835,715 A | 11/1998 | Dahl |
| 5,842,871 A | 12/1998 | Cutler et al. |
| 5,857,986 A | 1/1999 | Moriyasu |
| 5,959,717 A | 9/1999 | Chaum |
| 5,973,672 A | 10/1999 | Rice et al. |
| 6,001,017 A | 12/1999 | Okano et al. |
| 6,056,640 A | 5/2000 | Schaaij |
| 6,068,553 A | 5/2000 | Parker |
| 6,210,273 B1 | 4/2001 | Matsuno |
| 6,238,291 B1 | 5/2001 | Fujimoto et al. |
| 6,241,609 B1 | 6/2001 | Rutgers |
| 6,257,982 B1 | 7/2001 | Rider et al. |
| 6,280,323 B1 | 8/2001 | Yamazaki et al. |
| 6,280,325 B1 | 8/2001 | Fisk |
| 6,280,327 B1 | 8/2001 | Leifer et al. |
| 6,300,936 B1 | 10/2001 | Braun et al. |
| 6,346,045 B2 | 2/2002 | Rider et al. |
| 6,354,941 B2 | 3/2002 | Miller et al. |
| 6,409,599 B1 | 6/2002 | Sprout et al. |
| 6,409,604 B1 | 6/2002 | Matsuno |
| 6,434,398 B1 | 8/2002 | Inselberg |
| 6,507,353 B1 | 1/2003 | Huard et al. |
| 6,524,189 B1 | 2/2003 | Rautila |
| 6,540,614 B1 | 4/2003 | Nishino et al. |
| 6,585,590 B2 | 7/2003 | Malone |
| 6,612,578 B2 | 9/2003 | Falciglia, Sr. |
| 6,692,358 B2 | 2/2004 | Lawrence et al. |
| 6,705,945 B2 | 3/2004 | Gavin et al. |
| 6,709,335 B2 | 3/2004 | Bates et al. |
| 6,729,959 B1 | 5/2004 | Moore et al. |
| 6,773,349 B2 | 8/2004 | Hussaini et al. |
| 6,780,108 B1 | 8/2004 | Luciano, Jr. et al. |
| 6,845,980 B2 | 1/2005 | Falciglia, Sr. |
| 6,858,590 B2 | 2/2005 | Sällberg et al. |
| 6,921,336 B1 | 7/2005 | Best |
| 6,959,419 B2 | 10/2005 | Taniwaki |
| 6,977,667 B1 | 12/2005 | Burke |
| 6,996,413 B2 | 2/2006 | Inselberg |
| 7,004,839 B2 | 2/2006 | Suzuki et al. |
| 7,278,920 B1 | 10/2007 | Klamer et al. |
| 7,285,051 B2 | 10/2007 | Eguchi et al. |
| 7,445,549 B1 | 11/2008 | Best |
| 7,840,991 B2 | 11/2010 | Dusenberry et al. |
| 2001/0027128 A1 | 10/2001 | Rider et al. |
| 2002/0023265 A1 | 2/2002 | Metcalf |
| 2002/0094860 A1 | 7/2002 | Itkis et al. |
| 2002/0115488 A1 | 8/2002 | Berry et al. |
| 2002/0137562 A1 | 9/2002 | Malone |
| 2002/0142839 A1 | 10/2002 | Wolinsky |
| 2002/0147046 A1 | 10/2002 | Wang |
| 2002/0160824 A1 | 10/2002 | Goto et al. |
| 2002/0165028 A1 | 11/2002 | Miyamoto et al. |
| 2003/0050118 A1 | 3/2003 | Suzuki et al. |
| 2003/0073471 A1 | 4/2003 | Varley |
| 2003/0073472 A1 | 4/2003 | Varley |
| 2003/0074665 A1 | 4/2003 | Varley |
| 2003/0104868 A1 | 6/2003 | Okita et al. |
| 2003/0109306 A1 | 6/2003 | Karmarkar |
| 2003/0130039 A1 | 7/2003 | Nelson |
| 2003/0144017 A1 | 7/2003 | Inselberg |
| 2003/0168803 A1 | 9/2003 | Larkin |
| 2003/0199308 A1 | 10/2003 | Parker |
| 2003/0216177 A1 | 11/2003 | Aonuma et al. |
| 2003/0216179 A1 | 11/2003 | Suzuki et al. |
| 2003/0216185 A1 | 11/2003 | Varley |
| 2003/0217135 A1 | 11/2003 | Chatani et al. |
| 2004/0002326 A1 | 1/2004 | Maher |
| 2004/0068738 A1 | 4/2004 | Kinoshita |
| 2004/0077400 A1 | 4/2004 | Marshall |
| 2004/0152508 A1 | 8/2004 | Lind et al. |
| 2004/0152513 A1 | 8/2004 | Shimizu |
| 2004/0171381 A1 | 9/2004 | Inselberg |
| 2004/0224746 A1 | 11/2004 | Fong |
| 2004/0235568 A1 | 11/2004 | Kim |

(56) References Cited

U.S. PATENT DOCUMENTS

| | | |
|---|---|---|
| 2004/0266529 A1 | 12/2004 | Chatani |
| 2005/0026670 A1 | 2/2005 | Lardie |
| 2005/0026695 A1 | 2/2005 | Tsuchiyama et al. |
| 2005/0119053 A1 | 6/2005 | Suzuki et al. |
| 2005/0144251 A1* | 6/2005 | Slate ................. H04L 29/06 709/215 |
| 2005/0208991 A1 | 9/2005 | Luciano et al. |
| 2006/0017227 A1 | 1/2006 | Falciglia |
| 2006/0040727 A1 | 2/2006 | Lind et al. |
| 2006/0068917 A1 | 3/2006 | Snoddy et al. |
| 2006/0084504 A1 | 4/2006 | Chan et al. |
| 2006/0166731 A1 | 7/2006 | Yoshimi et al. |
| 2006/0287043 A1 | 12/2006 | Englman et al. |
| 2007/0004506 A1 | 1/2007 | Kinsley et al. |
| 2007/0270206 A1 | 11/2007 | Snoddy et al. |
| 2008/0054561 A1 | 3/2008 | Canterbury et al. |
| 2008/0214273 A1 | 9/2008 | Snoddy et al. |
| 2010/0178973 A1 | 7/2010 | Snoddy et al. |
| 2010/0267448 A1 | 10/2010 | Snoddy et al. |
| 2015/0028918 A1 | 1/2015 | Hutton |

FOREIGN PATENT DOCUMENTS

| | | | |
|---|---|---|---|
| EP | 277014 | A2 | 8/1988 |
| EP | 479422 | A2 | 4/1992 |
| EP | 631247 | A2 | 12/1994 |
| EP | 981119 | A2 | 2/2000 |
| JP | 06138979 | A | 5/1994 |
| JP | 08173633 | A | 7/1996 |
| JP | 09512401 | A | 12/1997 |
| JP | 10314444 | A | 12/1998 |
| JP | 11244528 | A | 9/1999 |
| JP | 2000157719 | A | 6/2000 |
| JP | 2000200361 | A | 7/2000 |
| JP | 2000245572 | A | 9/2000 |
| JP | 2001259226 | A | 9/2001 |
| JP | 2001321571 | A | 11/2001 |
| JP | 2001353375 | A | 12/2001 |
| JP | 2002066144 | A | 3/2002 |
| JP | 2002278869 | A | 9/2002 |
| JP | 2003006127 | A | 1/2003 |
| JP | 2003135857 | A | 5/2003 |
| JP | 2003236251 | A | 8/2003 |
| JP | 2004008578 | A | 1/2004 |
| JP | 2004223267 | A | 8/2004 |
| JP | 2008513167 | A | 5/2008 |
| WO | 9208531 | A1 | 5/1992 |
| WO | 9316776 | A1 | 9/1993 |
| WO | 9718370 | A2 | 5/1997 |
| WO | 9821682 | A1 | 5/1998 |
| WO | 0072930 | A1 | 12/2000 |
| WO | 03027970 | A2 | 4/2003 |
| WO | 2004063848 | A2 | 7/2004 |
| WO | 2006058408 | A1 | 6/2006 |

OTHER PUBLICATIONS

Stack "Interactive 'Ride' is Here—Run for your Life," San Fransisco Chronicle, May 6, 1995.
Rosenberg "Ride for your Life'—really," San Fransisco Chronicle, May 5, 1995.
"Ride for your Life," Box Office Magazine, obtained May 10, 2006 from http://www.boxoffice.com/bxoser/getreview.asp?where=ID& terms=3419.
Wagner. "New Technology exploits kids in Ride for Your Life" The Tech, May 5, 1995.
Heisler. "Fun Pad Mixes Entertainment and Advertising"; Advertising Age; May 31, 1999.
"Game Boy Battery Pack/AC Adaptor (1991)", http:www.gamersgraveyard.com/repository/gameboy/peripherals/bat-terypack.html. 1991.
"Free Bingo—Online Bingo Games," accessed at www.bingo.com, as early as May 11, 2006.
www.timeplay.com, Interactive Games: Games of Chance, Nov. 29, 2006 (Nov. 29, 2006), 5 pages.
Document relating to International Application No. PCT/CA2005/001442 dated, Dec. 14, 2005 (International Search Report).
Document relating to International Application No. PCT/CA2005/001442 dated, Dec. 14, 2005 (Written Opinion).
Document relating to International Application No. PCT/CA2005/001442 dated Mar. 27, 2007, (International Preliminary Report on Patentability).
Document relating to International Application No. PCT/CA2007/000770 dated, Oct. 24, 2007 (International Search Report).
Document relating to International Application No. PCT/CA2007/000770 dated, Oct. 24, 2007 (Written Opinion).
Document relating to International Application No. PCT/CA2007/000770 dated, Aug. 4, 2009 (International Preliminary Report on Patentability).
Game Boy Advance Game Link Cable, Nintendo of America Inc., 2003. 2 pages.
TimePlay—How It Works, Sep. 20, 2004, timePlay (available at http://web.archive.Org/web/20040920160128/http://timeplay.com.
"Bingo Hall," accessed at www.bingohall.com, as early as May 11, 2006.
"Ride for Your Life." Box Office Magazine, obtained May 10, 2006 from http://www.boxoffice.com/bxoser/getreview.asp?where=ID &terms=3419. "Trivia Bingo Gameshow Concept," accessed at www.firstbingo.com/game_concept.html, as early as May 11, 2006.
Rosenberg "Ride for Your Life—really." San Francisco Chronicle, May 5, 1995.
Stack "Interactive "Ride" is Here—Run for Your Life." San Francisco Chronicle, May 6, 1995.
"Game Boy Battery Pack/AC Adaptor." http://www.gamersgraveyard.com/repository/gameboy/peripherals/bat-terypack.Html. 1991.
Document relating to International Application No. PCT/CA200/000770 dated Oct. 24, 2007 (International Search Report).
Document relating to International Application No. PCT/CA200/000770 dated Oct. 24, 2007 (Written Opinion).
Harry Brignull and Yvonne Rogers. Enticing People to Interact with Large Public Displays in Public Spaces. Human-Computer Interaction—Interact'03 M. Rauterberg et al. (Eds) Published by IOS Press, (c) IFIP, 2003, pp. 17-24.
Greenberg et al. PDAs and Shared Public Displays: Making Personal Information Public, and Public Information Personal, mirrored from http://www.springerlink.com/content/m6j67n5244l27113/ Springer-Verlag London Ltd Personal Technologies (1999) 3:54-64.
A look back on a GameCube exclusive Final Fantasy gem. Nintendo Inquirer, http://nintendoinquirer.com/blog/2015/11/24/a-look-back-on-a-gamecube-exclusive-final-fantasy-gem/ Mar. 21, 2016 12:55:31 PM].
Pac-Man vs. Reviewed on GCN. Dec. 9, 2003. http://ca.ign.com/articles/2003/12/10/pac-man-vs [Mar. 21, 2016 12:59:59 PM].
Nintendo Gamecube. Game Boy Player Device and Instruction Booklet (2003) Nintendo of America Inc. P.O. Box 957, Redmond, WA 98073-0957 U.S.A.
Customer Service—Nintendo GameCube—Game Boy Player MultiplayerGame Boy Player—Playing Multi player Games, http://www.nintendo.com/consumer/systems/nintendogamecube/gameboyplayer_multi.jsp[Mar. 21, 2016 2:33:10 PM].
Sega Dreamcast Visual Memory Unit Instruction Manual. Sega Enterprises, Ltd., 1999.
A tribute to the Dreamcast VMU I GamesRadar+. http://www.gamesradar.com/a-tribute-to-the-dreamcast-vmu/[Mar. 21, 2016 3:41:38 PM].
Evolution of the Console Controller—Dreamcast Controller and VMU. https://www.digitalgamemuseum.org/consolecontrollerevolution/analog/dreamcast/ [Mar. 21, 2016 3:46:40 PM].
Sega Dreamcast Review & Rating I PCMag.com. http://www.pcmag.com/article2/0,2817,86189,00.asp[Mar. 21, 2016 4:09:56 PM].
Sega Dreamcast Controller Instruction Manual 1999. © Sega Enterprises, Ltd., 1999.
Grant Brunner. The rise of second screen gaming: Where will the PS4 and Xbox One take us? Extreme Tech Article. http://www.

(56) References Cited

OTHER PUBLICATIONS extremetech.com/gaming/174482-the-rise-of-second-screen-gam-ing-where-will-the-ps4-and-xbox-one-take-us[Mar. 21, 2016 3:54:16 PM].

Final Fantasy Crystal Chronicles Players Guide. Nintendo Gamecube, Nintendo of America Inc., 2004, 24 pages. Available online: https://www.nintendo.com/consumer/gameslist/manuals/GCN_F inal_F antasy_Cry stal_Chronicles .pdf.

Izadi et al. Dynamo: A public interactive surface supporting the cooperative sharing and exchange of media. Letters CHI. vol. 5, Issue 2, 2003. pp. 159-168.

Nintendo Game Cube Instruction Booklet. 2001-2004. Nintendo of America Inc. P.O. Box 957, Redmond, WA 98073-0957 U.S.A. Available online: https://www.nintendo.com/consumer/downloads/gen 101 _manual_english .pdf.

Sega Dreamcast Instructions Manual. Sega Enterprises, Ltd., 2000. pp. 1-32. Sega of America, Inc. P.O. Box 7639 San Francisco, CA, 94120-7639. Available online: http://www.videogameconsolelibrary.com/images/Manuals/98_Sega_ Dreamcast-Manual.pdf.

Document relating to Japanese App. No. 2015-236322 (Notice of Reasons for Rejection—Office Action) dated Feb. 14, 2017. English translation.

Drimaga Books Phantasy Star Online Perfect Guide, Softbank Publishing Inc., Feb. 6, 2001, First edition, p. 63.

TimePlay—What is TimePlay, Sep. 20, 2004, TimePlay (available at http://web.archive.org/web/20040920160128/http://timeplay.com). U.S. Appl. No. 12/688,322 (Office Action dated Nov. 10, 2015).

Soulcalibur II Players Guide, Sofebank Publishing Inc., Aug. 16, 2002, First Edition, pp. 8-9, 13 and 27.

V Jump Books [Game Series] Playstation Version From TV animation One Piece Grand Battle! 2, II, Shueisha Inc, Jun. 8, 2002, Third Edition, p. 91.

Scarne, John, "Scarne's Complete Guide to Gambling", Simon and Schuster, New York, 1961, Chapter 8, 22 pages.

Final Fantasy Crystal Chronicles Players Guide, Nintendo Gamecube, Nintendo of America Inc., 24 pages, 2004.

* cited by examiner

SYSTEM, METHOD AND HANDHELD CONTROLLER FOR MULTI-PLAYER GAMING

CROSS REFERENCE TO RELATED APPLICATIONS

This application is a continuation of U.S. patent application Ser. No. 14/161,197, filed Jan. 22, 2014, which is a continuation of U.S. patent application Ser. No. 12/638,813, filed Dec. 15, 2009, which is a continuation of U.S. patent application Ser. No. 11/232,199, filed Sep. 21, 2005 and claims priority from U.S. Provisional Patent Application Ser. No. 60/697,037, filed Jul. 6, 2005, and U.S. Provisional Patent Application Ser. No. 60/611,945, filed Sep. 21, 2004, the entire contents of all of which are hereby incorporated by reference.

FIELD OF THE INVENTION

The invention relates to systems, methods and apparatus for multi-player gaming. In particular, the multi-player gaming involves a common display visible to multiple players while each of a plurality of game controllers is controlled by a respective player associated with a particular game character.

BACKGROUND OF THE INVENTION

In a multi-player game environment where a large number of users can play an interactive action-based game on a single large display screen, such as that which may be found in a cinema, for example, it may be difficult for one of a large number of players to identify his or her onscreen character (or avatar) amongst all of the characters of the other players on the screen. This difficulty would be increased if the game characters chosen by the various players look similar to each other.

If a player is not easily (or readily) able to identify his or her game character on the large screen, the player's enjoyment of, and thus incentive to play, the game may be diminished.

A further problem in such a multi-player game environment arises in relation to receiving game input commands from all of the large number of players. In an existing cinema or other large arena, for example, it may not always be cost-effective or practical to provide cabling or wiring to a large number of player input terminals for receiving the player input commands.

It is desired to address or ameliorate one or more shortcomings of existing multi-player gaming systems, or to at least provide a useful alternative to the prior art.

SUMMARY OF THE INVENTION

Aspects of the invention relate to systems and methods for multi-player gaming. Some aspects relate to systems having an improved communications infrastructure and improved handheld game controllers, while other aspects relate to improvements in handling large numbers of players in the multi-player game, for example, by enabling easy identification of a player's on-screen character (or avatar) or by providing a pre-game activity on the handheld game controller prior to allowing a player to join the multi-player game. Yet other aspects relate to methods of multi-player gaming and player registration for a multi-player game.

In one aspect, the invention relates to a multi-player game system comprising:

a game server configured to provide display signals for displaying a multi-player game;

a display system having primary display means, the display system being configured to provide a primary game display of the multi-player game on the primary display means in response to the display signals;

a plurality of game controllers, each game controller having secondary display means for providing a secondary game display and input means for receiving player input; and communication means for enabling communication between the game server and each of the plurality of game controllers;

wherein the plurality of game controllers are located in proximity to the primary display means such that the primary display means is visible to game players manipulating respective game controllers.

The secondary game display may relate to, but be different from the multi-player game or it may relate to another game or activity, either independent of the multi-player game or as a pre-cursor or prelude thereof. In one preferred embodiment, the secondary game display may display a single-player game directly related to the multi-player game.

The primary display means preferably includes a large display screen, for example of a size which is used in cinemas. The large display screen may be a projection screen, in which case the display system includes a projector to project an image of the multi-player game on the display screen. The display system may use projection equipment which is normally used for projecting films if that equipment is configured to project digital images.

The game controllers are preferably small handheld computing devices with wireless transmitter means for communicating with the game server. Alternatively, the handheld computing devices may be in wired communication with the game server over a network, such as an Ethernet.

In one embodiment, each handheld computing device receives power from an external source, such as an externally mounted battery pack. The handheld computing devices are preferably each connected to an arm of a seat or to another fixed structure in the game arena.

The battery pack is preferably removably mounted to the seat arm or other fixed structure, while the handheld computing device is connected to the seat arm or other structure by means of a tether. The tether comprises a movable connection means for allowing the handheld computing device to move relative to the seat arm or other structure and houses a power cable for supplying power to the handheld computing device from the battery pack. The tether may comprise a rigid connecting arm or may comprise a flexible retractable cable.

The game arena may be in an enclosed theatre, such as a movie theatre, or it may be another kind of venue, such as an outside amphitheatre, convention hall, meeting room or other suitably large place that has a suitable display system and communications infrastructure enabling communication between the game controllers and the game server.

The game arena preferably has a large number of seats (for example, in the order of fifty to a few hundred seats) facing the display screen so that the players can face the display screen and hold the secondary display of the game controller within view, while seated in the seats in the game arena.

The game system preferably supports up to a few hundred game controllers so that, in a game arena having a potential occupancy of a few hundred people, almost every person may participate in the multi-player game, if desired or allowed. In such an environment, it would be appreciated that, if each of a few hundred players controls a corresponding game character or avatar on the primary display, it may be difficult for each player to identify his or her corresponding game character or avatar among the many displayed, without some means of assisting the player to identify or locate his or her game character or avatar or some means of limiting the number of avatars on the primary display.

In a preferred environment, the display screen and game controllers are located in a game arena so that players can control their game characters or avatars on the large display screen by manipulating the game controller held in front of them. In this way, a player can easily switch his or her gaze from the large screen to the secondary display on the game controller and back again. In one embodiment, the secondary display may provide a simplified representation of the game environment, showing the player's game character or avatar within that environment. Thus, the secondary display enables each player to easily locate his or her game character within the displayed game environment.

Each game controller preferably comprises player input means. The player input means preferably comprises at least a joystick, action buttons and a location button for triggering a character location function. The display screen of the game controller is preferably formed as a touch screen, by which the user can provide input by touching portions of the display screen. The game controller may also have a card reader, for example in the form of a smart card slot or magnetic strip reader, for authenticating a player for participation in the game.

The game controller preferably also contains means for providing a sensory output to the player, for example including a vibration module and an audio output (speaker) for providing vibratory and auditory output, respectively. The display screen of the game controller may also be used to provide a sensory (visual) output to the player, corresponding to the vibratory or auditory output.

The communication means preferably includes a communication controller in communication with the game server over a high-speed interface and having a wireless transmitter and at least one wireless receiver. Each game controller also has a wireless transceiver module, forming part of the communication means, to receive signals from the wireless transmitter and transmit signals back to the game server via the at least one wireless receiver. In order to enable effective communication between the game controllers and the game server, the wireless transmitter and wireless receivers are located within the game arena. The game server and communication controller need not be located in the game arena.

The transmitter is preferably located on a ceiling or upper sidewall portion of the game arena, generally toward the display screen. Preferably, the transmitter is directionally oriented to transmit communication signals to the game controllers in a direction generally away from the display screen.

The game arena preferably has several receivers located in a spaced configuration around the game arena. The receivers are preferably located generally away from the display screen, on the ceiling or side or rear walls of the game arena.

In another aspect of the invention, there is provided a multi-player game system comprising:

a game server configured to provide display signals for displaying a multi-player game wherein players are represented in the multi-player game by respective avatars;

a display system having visual display means for displaying the multi-player game in response to the display signals;

a plurality of game controllers in communication with the game server, each game controller having input means for receiving game commands from a respective player in relation to the multi-player game and output means for providing a sensory output to the respective player;

wherein the input means includes means for receiving an avatar identification request and each game controller is configured to transmit a communication signal corresponding to the avatar identification request to the game server, which in response thereto causes an enhanced visual indication of the respective avatar to be provided on the visual display means substantially simultaneously with the sensory output to the respective player.

A related aspect of the invention provides a method of avatar identification in a multi-player game, comprising:

providing a display of a multi-player game, the display comprising a plurality of avatars;

providing a plurality of game controllers in communication with a game server, each game controller being configured to transmit command data to the game server to control one of the avatars in the multi-player game;

receiving at the game server command data corresponding to an avatar identification request of the avatar corresponding to one of the plurality of game controllers;

displaying an enhanced visual representation of the avatar on the display in response to the avatar identification request; and providing a sensory output from the one game controller to a player manipulating the one game controller substantially simultaneously with the display of the enhanced visual representation.

The sensory output may be one or more of auditory, vibratory or visual output. In order to provide such sensory output, each of the game controllers preferably comprises a speaker, vibration generator and display screen. Preferably the sensory output of each game controller comprises a unique output sequence or pattern.

A further aspect of the invention relates to a an entertainment system comprising:

a game server configured to process a multi-player game and provide display signals for displaying the multi-player game;

a display system having primary display means for providing a primary display of the multi-player game in response to the display signals;

a plurality of game controllers, each game controller having processing means, secondary display means for providing a secondary display, and player input means; and communication means for enabling communication between the game server and the game controllers;

wherein the processing means of each game controller is configured to operate in a multi-player game mode, in which a player manipulating the player input means of the game controller controls an avatar on the primary display and the secondary display means provides a display related to play of the multi-player game, or to operate in a single player activity mode, in which the player conducts a single-player activity on the game controller and the secondary display means provides a display of the single player activity.

In one embodiment, the single-player activity is a single-player game directly related to the multi-player game. Alternatively, the single-player activity may be a game unrelated to the multi-player game or it may be an activity other than a game, such as browsing Internet or intranet sites. In one embodiment, the single player activity may be a pre-qualification game for enabling the player to qualify for participation in the multi-player game.

Preferably, the visual display means and game controllers are located in a game arena, as described above in relation to the first mentioned aspect. Preferably, the game controllers communicate with the game server via communication means at least partly disposed within the game arena. Such communication means preferably includes wireless transceivers in the game controllers and a wireless transmitter and at least one wireless receiver in communication with the game server.

In a further aspect, there is provided a multi-player game system comprising:

a game server configured to provide display signals for displaying a multi-player game; and a game arena comprising:

a display system having visual display means for displaying the multi-player game in response to the display signals;

a wireless transmitter in communication with the game server for transmitting game data signals within the game arena;

a plurality of game controllers adapted to receive the game data signals from the wireless transmitter and to transmit command data signals corresponding to player input commands; and at least one wireless receiver in communication with the game server for receiving the command data signals from the plurality of game controllers and communicating the command data signals to the game server;

wherein the wireless transmitter is disposed in an upper part of the game arena and a transmission direction of the game data signals from the wireless transmitter is generally toward the game controllers; and wherein the at least one wireless receiver is disposed in the game arena generally away from the wireless transmitter.

A related aspect of the invention provides a multi-arena game system comprising a plurality of multi-player game systems as described above.

The plurality of game controllers may each have a display screen and player input means, such as a joystick, action or command buttons and a touch screen. The receipt of game data and transmission of commands data is performed by a wireless transceiver in each game controller. Each game controller may also have a vibration module and speaker for providing vibratory and auditory output to the player during the game. This sensory output may be augmented by the display screen on each game controller.

The display screen on each game controller may be used to provide a secondary display of the multi-player game or to provide game information, such as player statistics, relating to the multi-player game. Alternatively, the secondary screen on each game controller may be used to perform an activity either unrelated to the multi-player game or indirectly related, for example such as a qualification or preparation activity for joining the multi-player game.

In a still further aspect, there is provided a handheld game controller for a multi-player game, comprising:

a display screen for displaying a first display related to the multi-player game;

player input means for receiving game control input from a player of the multi-player game in relation to a corresponding avatar of the multi-player game;

processor means for processing the game control input to generate first game signals and for generating the first display based at least in part on received second game signals; and a transceiver for transmitting the first game signals to a game server facilitating the multi-player game to allow the game server to generate a second display of the multi-player game based in part on the first game signals and for receiving the second game signals from the game server;

wherein the second display includes the avatar and player input means is useable by the player to control the avatar within the multi-player game.

Preferably, the player input means comprises a joystick, action buttons, command buttons and a touch screen. The handheld game controller may also comprise a card reader for reading a smart card or magnetic strip card for the purpose of receiving payment from a player of the multi-player game. Preferably, the handheld game controller also comprises a vibration module and a speaker for generating vibrations and sounds, respectively.

Preferably, the handheld game controller may be operated in a lateral or longitudinal orientation and the display screen has a corresponding lateral or longitudinal visual orientation in such modes.

The transceiver is preferably a wireless transceiver. Advantageously, providing a wireless communications infrastructure between the game server and the handheld game controllers obviates the need for providing a dedicated, wired connection between each handheld game controller and the game server, which results in time and cost savings in installing the multi-player game system and provides for greater simplicity and elegance of design.

Advantageously, providing a screen on the handheld game controller allows for greater variation in operation of the multi-player game, as the player can experience the multi-player game on the small screen of the handheld game controller as well as on the large display screen of the game arena. Further, the display screen of the handheld game controller serves as a user interface to the multi-player game system, enabling the player to make selections and provide input in response to options or instructions provided on the game controller screen. Further, the display screen of the handheld game controller may be used by players not directly participating in the multi-player game, to either undertake a pre-game activity or partake in an activity not related to the multi-player game, such as an independent single player game or browsing content provided by a network to which the game server is connected. Further, the display screen of the handheld game controller may be used to assist the player in locating his or her game avatar within the multi-player game environment displayed on the large display screen.

Advantageously, the handheld game controllers are equipped with sensory output means such as vibratory and auditory output means, for providing a sensory output to the player synchronously with providing an enhanced visual indication of the player's avatar on the large display screen and thereby allowing the player to more easily identify the player's avatar. The multi-player game system also enables new methods of multi-player gaming and player registration.

In a further aspect, the invention relates to a method of player registration for playing a multi-player game. Player registration is initiated by each prospective player of the multi-player game by inputting a payment authorization code, which may be an account code, into a handheld game controller. The payment authorization code may be received from a built-in card reader, where a card having the code stored thereon is passed through or into the card reader, or by manual input. The handheld game controller tries to validate the payment authorization code and, if valid, encrypts the code and sends it to a game server that facilitates the multi-player game. The game server decrypts the code and attempts to recognize it as pertaining to an existing (pre-registered) account useable for paying for the multi-player game. If the game server recognizes the decrypted code, it checks whether there are sufficient funds in the account to allow the player to play the multi-player game. If sufficient funds exist on the account, the account is debited for an appropriate amount and the player becomes registered to play the multi-player game. The handheld game controller is then unlocked for use by the player for playing the multi-player game (or for performing another activity) and relevant game software is downloaded from the game server to the handheld game controller to enable the player to participate in the multi-player game by manipulating the handheld game controller.

The method of player registration is preferably performed in conjunction with a multi-player game system having a display system and arranged in a game arena. The game arena includes a plurality of the handheld game controllers, the display system and wireless communication means for enabling the handheld game controllers to communicate with the game server.

In a still further aspect, the invention relates to a method of conducting a multi-player game. The method involves receiving at a game server a plurality of registration requests from respective game controllers manipulated by prospective players of the multi-player game. The registration requests are processed so as to register eligible prospective players as registered players of the multi-player game. A number of registered players are added to the multi-player game, up to a predetermined number of players and the game is then begun. During play of the multi-player game, one or more registered players previously added to the game are removed from the game in response to one or more predetermined game removal events. Once registered players have been removed from the game, a corresponding number of registered players are added to the game so that the number of registered players playing the multi-player game does not exceed the predetermined number of players. Once a predetermined game end event occurs, the multi-player game is ended. One or more of the players may be declared to be the winner or winners, following the end of the game, depending on the achievements of the registered players during play of the multi-player game.

The multi-player game is preferably displayed on a large display screen in a game arena housing the game controllers and the registered players. The one or more predetermined game end events may include expiry of a predetermined game time, achievement by one or more of the players of a game objective or if all registered players have become removed from the multi-player game.

Following the registration of eligible prospective players (where eligibility is determined at least partly on the basis of successful payment for the multi-player game), the game server preferably downloads a game module to each game controller for facilitating play of the multi-player game. Alternatively, the game module may be pre-loaded into the game controllers and enabled once registration is complete.

Further aspects of the invention relate to computer readable storage media having stored therein computer program instructions which, when executed by one or more processors, cause the one or more processors to perform any one of the methods described herein.

Further aspects of the invention relate to methods of facilitating team play in a multi-player game. In one such aspect, a plurality of handheld game controllers are provided in a game arena. The handheld game controllers each has input means for receiving player input from respective players and a first display screen for displaying game-related images. A game server is also provided in communication with the handheld game controllers for receiving first signals from each handheld game controller and for transmitting second signals to the handheld game controllers. The first signals correspond at least in part to player input received at the respective hand held game controller.

In response to player input from a first player, the game server receives a team creation request from a first handheld game controller. In response to the team creation request, the game server creates a team entry in a team table maintained by the game server. The game server then adds a player entry for the first player to the team entry. In response to player input from a second player, the game server receives a team join request from a second handheld game controller. In response to the team join request, the game server adds a player entry for the second player to the team entry. A team can then be formed on the basis of the team entry and the multi-player game then started. Once the multi-player game is started, the game server causes game images of the multi-player game to be displayed on a second display screen. The game images comprise a plurality of avatars, at least one of which corresponds to the team and is controllable in response to player input from the first and second players.

The game may receive multiple team join requests from multiple players and may add player entries to the team entry, optionally only if the first player consents to those players joining the team. The team preferably has a predetermined limited number of team positions, for example such as 4 or 6, and at least some of the positions involve performing different roles or functions within the team. Preferably, the players may change positions during the game.

In another aspect, the invention relates to a multi-player game system comprising: a game server configured to provide display signals for displaying a multi-player game; a display system having primary display means, the display system being configured to provide a primary game display of the multi-player game on the primary display means in response to the display signals; a plurality of game controllers, each game controller having input means for receiving player input relating to the multi-player game, the plurality of game controllers being located in proximity to the primary display means such that the primary game display is visible to game players manipulating respective game controllers; communication means for enabling communication between the game server and each of the plurality of game controllers; and at least one remote game controller located remotely from the primary display means and having secondary display means for displaying a secondary game display of the multi-player game and input means for receiving player input relating to the multi-player game, the at least one remote game controller being in communication with the game server over a network.

BRIEF DESCRIPTION OF THE DRAWINGS

Exemplary embodiments of the invention are described in further detail below, by way of example only, with reference to the accompanying drawings, in which.

DETAILED DESCRIPTION OF EMBODIMENTS OF THE INVENTION

Figure 1:
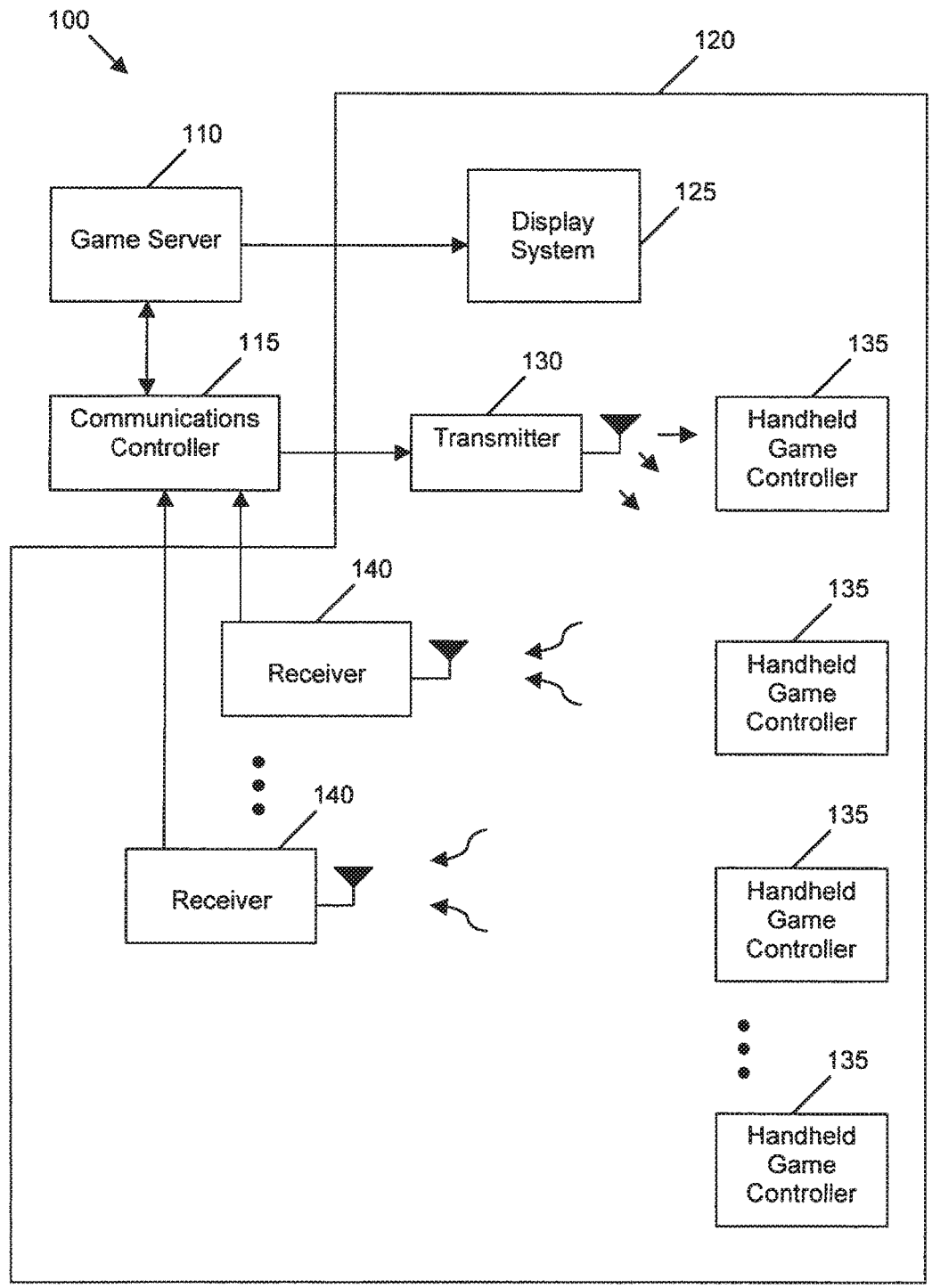
FIG. 1 is a block diagram of a multi-player game system, according an embodiment of the invention.

Embodiments of the invention are hereinafter described in further detail, by way of example only, with reference to the accompanying drawings. In the following description, like reference numerals will be used to indicate like, similar or corresponding features, functions or elements as between the drawings and embodiments depicted therein.

Embodiments of the invention relate to methods and systems for multi-player gaming. In the following description of these embodiments, certain aspects of the embodiments are described separately. For example, the system architecture is described separately to the example game implementations and game software. It should be understood, however, that each of these aspects forms at least part of the described embodiments.

Multi-Player Gaming System Architecture

Referring now to FIGS. 1, 2, 3 and 4, system architecture aspects of the multi-player gaming system will now be described. FIG. 1 shows a multi-player gaming system 100 according to one embodiment of the invention, comprising a game server 110, a communications controller 115 and a game arena 120.

The game server 110 stores and runs game software 310 for facilitating the multi-player game. The game server 110 interfaces with the game arena 120 through communications controller 115, which controls high speed wireless (radio frequency) communication within the game arena 120 and high speed wired communications to and from the game server 110. Game arena 120 comprises a display system 125, a wireless transmitter 130, a plurality of handheld game controllers 135 and at least one (up to, say, 6) wireless receiver 140.

The game arena 120 is preferably a large indoor screening area 400, such as a cinema, theatre, conference hall, presentation hall or the like. Alternatively, the game arena 120 may be an outdoor facility, such as an amphitheatre, stadium or other outdoor area where the attention of participants can be focused on a large central display.

Display system 125 is disposed within the game arena 120 and comprises a projector and a large display screen upon which images of the multi-player game are displayed when the game is being played. The projector is preferably of a kind normally used for digital projection of films in a cinema. An example of a suitable projector is the Wide XGA Digital Multimedia Projector by Sanyo, model PLV-WF10.

The display screen (shown in FIG. 4 and designated by reference numeral 425) may be any suitable screen for displaying images thereon, for example such as a movie screen or other flat or substantially planar surface of suitable reflectivity for viewing video images. The display screen may comprise a wall or part thereof, depending on the physical characteristics of the game arena 120.

The game arena 120 is intended to accommodate a relatively large number of handheld game controllers 135, for example in the order of 20 to 250 handheld game controllers 135. Each handheld game controller 135 is used by an individual player of the multi-player game while seated, or otherwise located, within the game arena 120. For example, each handheld game controller 135 may be associated with a seat facing the large display screen 425 so that players of the multi-player game can sit in seats in the game arena 120 and manipulate the handheld game controllers 135 while viewing a display of the multi-player game on display screen 425. The components and operation of handheld game controllers 135 are described in further detail below.

The game system 100 shown in FIG. 1 is an embodiment in which the multi-player game may be performed in a single game arena 120. In another embodiment, such as is shown in FIG. 2, a number of multi-player games may be performed in separate game arenas 120, located relatively near each other or remotely from each other.

Figure 2:
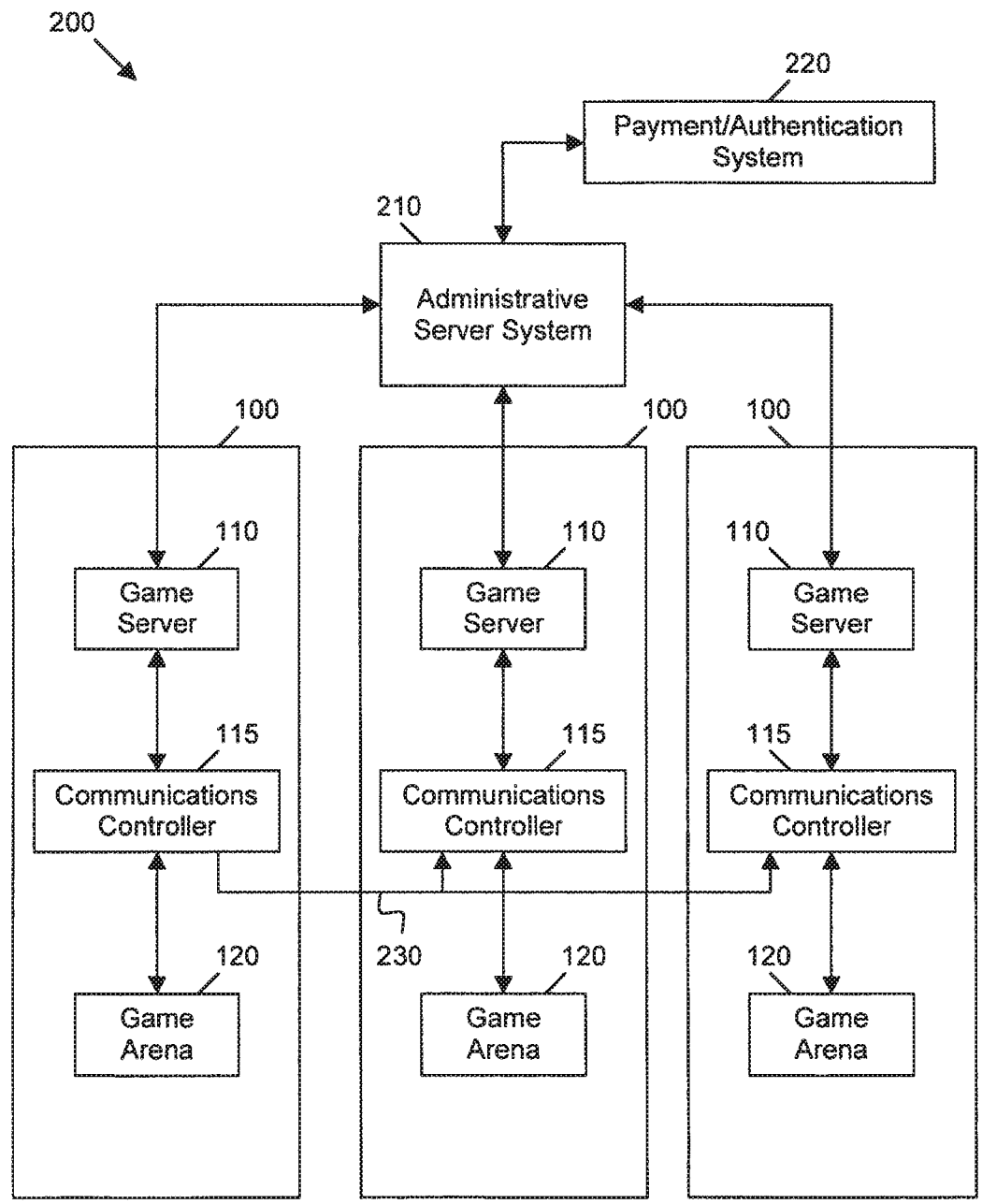
FIG. 2 is a block diagram of a multi-player game system according to another embodiment of the invention.

In the embodiment shown in FIG. 2, each multi-player game system 100 has a game server 110, communications controller 115 and game arena 120, as described above in relation to FIG. 1. Each of these multi-player game systems 100 may be included within a larger multi-arena game system 200. The multi-arena game system 200 comprises an administrative server system 210 in communication with the game servers 110 of each of the multi-player game systems 100, as well as a payment/authentication system 220 for player authentication and payment processing.

The administrative server system 210 performs overall system administration functions, as well as facilitating communications between game servers 110 of different multi-player game systems 100. For example, administrative server system 210 may keep a register of players who have chosen to provide registration information prior to playing a game and/or as part of providing payment information. The administrative server system 210 is also configured to perform non-game specific functions. For example, the administrative server system 210 logs statistics, such as the average number of players, the average length of play time and the average spend of each player, in order to assist in analyzing system performance and customer usage.

In one embodiment, game arenas 120 within the multi-arena game system 200 may be adjacent cinemas within a cinema complex. In such a case, wireless communications from one game arena 120 may cross over into an adjacent game arena 120, causing interference or disruption to the multi-player game.

In order to avoid transmission of game data at the same time in adjacent game arenas 120, a communications clock signal 230 is employed so as to synchronize the communications controllers 115 of all multi-player game systems 100 within multi-arena game system 200. Thus adjacent game arenas 120 are controlled so as to not transmit game data at the same time. Instead, a clock cycle of, say 40 Hertz, is used to allocate a transmission period of 12.5 milliseconds for communications within one or more separated game arenas 120. Once that 12.5 millisecond period passes, adjacent game arenas 120 are allowed to transmit for a subsequent period of 12.5 milliseconds. If significantly fewer handheld game controllers 135 than the maximum (256) are in use, say less than 128, the transmission period may be doubled or otherwise increased.

For clocking purposes, one communications controller 115 is designated by administrative server system 210 to provide the master communications clock signal 230 from which other communications controllers 115 follow, to coordinate transmission timing. A dedicated clock cable, for example such as a twisted pair, is provided for communicating the master communications clock signal 230.

Depending on the number and physical arrangement of the multiple game arenas 120 within multi-arena game system 200, the communications clock 230 can be used to ensure that immediately adjacent game arenas 120 do not transmit data at the same time, while allowing game arenas 120 that are sufficiently remote from each other to transmit simultaneously (as there is less chance of interference in such a case). Alternatively, if each game arena 120 has sufficient electromagnetic shielding to sufficiently reduce the likelihood of interference from adjacent game arenas 120, the communications clock 230 may be unnecessary and the data communications rate within each game arena 120 would not need to be reduced.

FIG. 2 shows a multi-arena game system 200 having three multi-player game systems 100. It should be understood, however, that there may be any number of multi-player game systems 100 within multi-arena game system 200. For example, a cinema complex may host ten multi-player games in ten different theatres, with each theatre being a game arena 120 of a multi-player game system 100, within an overall multi-arena game system 200. Further, cinema complexes at different locations may be governed by the same multi-arena game system 200, sharing a single administrative server system 210.

While multi-arena game system 200 is shown having multiple multi-player game systems 100, an alternate embodiment provides a single multi-player game system 100 operating with its own administrative server system 210 and payment/authentication system 220. This embodiment may be more suitable where only one game arena 120 can be accommodated at a certain location.

Figure 3:
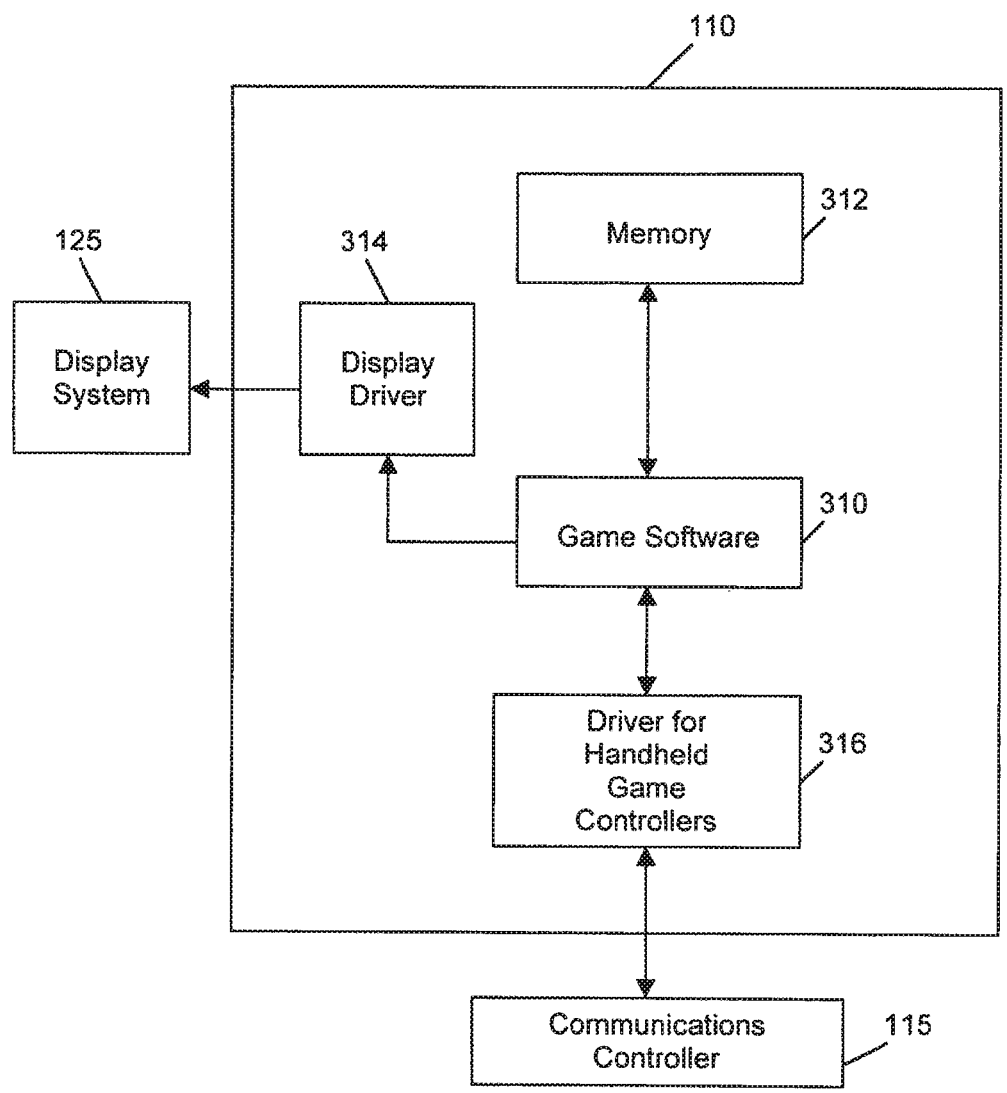
FIG. 3 is a block diagram of a game server according to another embodiment of the invention.

Referring now to FIG. 3, the game server 110 is described in further detail. Game server 110 accesses computer program instructions in the form of game software 310 stored in memory 312. The game software 310 is loaded from memory 312 and processed by a computer processor (not shown). The game server 110 also comprises a display driver 314 responsive to instructions from game software 310 for providing display instructions to display system 125. Game server 110 further comprises a game controller driver 316 for providing game data to, and receiving player command data from, handheld game controllers 135 via communications controller 115.

The game software 310 running on game server 110 may vary according to the desired game to be played on multi-player game system 100. The appropriate software may be loaded from memory 312 in response to votes cast by players when initiating the multi-player game or in response to a selection by an administrative operator of game server 110 or administrative server system 210.

When the game to be played has been selected and game software 310 is loaded from memory 312, game server 110 downloads a game software module to each of the handheld game controllers 135 via communications controller 115 prior to initiation of the multi-player game. This download may take several minutes but is necessary in order to enable a complimentary display to be provided on the display screen of the handheld game controller 135 during operation of the multi-player game.

The game software module thus downloaded from game server 110 onto handheld game controller 135 may also include software to enable activities not directly related to the multi-player game, such as a pre-game qualification activity, to be performed. Alternatively, in response to a request from the player, game server 110 may download to the handheld game controller 135 a game software module for a game other than the multi-player game, to be played by the player as a single player game, thus enabling a player to opt out of the multi-player game if it is not of interest to him/her.

Each handheld game controller 135 is provided with suitable software stored in memory for accomplishing certain basic functions, such as processing (including encrypting) payment authorization information received from a player prior to commencement of a game. This pre-loaded software may also include a browser application for enabling Internet or other more restricted network browsing, such as of a theater intranet. Intranet browsing in such a manner advantageously allows the person browsing to preview upcoming films, games, promotions and other forms of product or service marketing. Also, the handheld game controllers 135 may have video images or static images pre-loaded into memory, for example, so that a person manipulating one of the handheld game controllers 135 can view (on display screen 640) advertisements for upcoming films or games or other products or services.

Referring again to FIG. 1, wireless transmitter 130 and wireless receivers 140 include suitable hardware and/or software modules for wireless communications at radio frequencies with handheld game controllers 135. The communications controller 115 comprises a high-speed serial interface for communicating data to transmitter 130 for transmission to the handheld game controllers 135 and for receiving command data from the handheld game controllers 135 via wireless receivers 140.

Communications controller 115 is configured to transmit data packets to the handheld game controllers 135 at a rate of up to 1 megabit per second via wireless transmitter 130 using a transmission frequency of about 2.4 gigahertz.

It should be understood that transmission rates and communications infrastructure described herein are exemplary only, as it is anticipated that improved transmission rates and communication infrastructures will be available in future. Thus, while the communications infrastructure described herein is presently considered to provide high-speed communications, such infrastructure may not be considered high speed by future standards.

Communications controller 115 communicates the received command data to, and receives game data from, game server 110 over a high-speed wired connection, preferably having at least a 10-megabit per second transmission rate in either direction. A suitable connection between the game server 110 and communications controller 115 is an Ethernet connection.

Wireless transmitter 130 comprises suitable RF transceiver, controller, amplifier and antenna hardware modules (not shown) for high-speed wireless data transmission. An example RF module is RF Waves RFW-D100 Link Manager with an RFW112-M transceiver. The transmitter antenna of wireless transmitter 130 provides a directional broadcast of the data signal into game arena 120.

Wireless receivers 140 each comprise a similar RF receiver module, including antenna, amplifier, controller and transceiver hardware modules. Command data transmitted by the handheld game controllers 135 is received by the receiver antenna of each wireless receiver 140. Depending on the location of each wireless receiver 140 relative to the handheld game controllers 135 within game arena 120, one wireless receiver 140 may receive a stronger signal from a particular handheld game controller 135 or that signal may be received at that wireless receiver 140 slightly earlier than at other wireless receivers 140.

Command data transmitted from handheld game controllers 135 is received at wireless receiver 140, which then outputs the command data to the high-speed serial interface in communications controller 115, which in turn provides that data to game server 110.

Data is communicated between the handheld game controllers 135 and the game server 110 in the form of packets. Depending on the purpose of the communication, the number of bytes in each packet may vary. The types of packets include at least the following: a polling packet from the game server 110 to a particular handheld game controller 135; a standard response packet from the handheld game controller 135 to the game server 110, providing data corresponding to any input received from the player; and an interrogation response packet provided from the handheld game controller 135 to the game server 110, sent in response to an interrogation packet received from the game server 110. Other data packet structures may be used to transmit game/command data and information not specifically related to the multi-player game, such as registration-related information or for data or software downloads.

Because wireless data transmissions experience attenuation and are affected by noise, all data communications between the game server 110 and the handheld game controllers 135 include some form of error detection code, for example such as a checksum byte or cyclic redundancy code.

Game controller driver 316 (shown in FIG. 3) includes an input buffer (not shown) and an output buffer (not shown) for receipt and transmission, respectively, of data from and to each handheld game controller 135. Separate input and output buffers are dedicated for communications with each handheld game controller 135 for which a player is registered. Tables 1-3 below illustrate an exemplary packet structure for each of the polling, standard response and interrogation response packets.

The polling packet, as exemplified in Table 1, is transmitted by the game server 110 within the transmission period allowed by the master communications clock 230 (for example, 12.5 ms). The polling packet includes six bytes for communicating a command, an arena identifier, a game controller identifier, a data payload of two or three bytes and a checksum byte.

TABLE 1

Polling Packet

| | Data (8 bits) | Comments |
|---|---|---|
| Byte 1 | CCCTTTTT | C = command T = Arena ID |
| Byte 2 | DDDDDDDD | D = Controller ID |
| Byte 3 | 11111111 | Data 1 (Extended command if CCC bits = 000) |
| Byte 4 | 22222222 | Data 2 |
| Byte 5 | 33333333 | Data 3 |
| Byte 6 | SSSSSSSS | Check sum of 1-5 (+controller ID or 0x0FF if error) |

The handheld game controller 135 ignores the polling packet if the checksum is incorrect. If the checksum byte is correct, the handheld game controller 135 responds with a five-byte standard response packet that specifies the current state of the handheld game controller 135. If the current state of the handheld game controller 135 is normal, the controller ID is added into the checksum. If not, an error code, such as 0x0FF (255 decimal), is added to the checksum.

TABLE 2

Standard Response Packet

| | Data (8 bits) | Comments |
|---|---|---|
| Byte 1 | KKKKKKKK | Key matrix bits 1-8 |
| Byte 2 | XXXXXXXX | Joystick X-axis position |
| Byte 3 | YYYYYYYY | Joystick Y-axis position |
| Byte 4 | -KTTTTTT | Key matrix bit 9, touchpad 1-7 |
| Byte 5 | SSSSSSSS | Check sum of 1-4 (+controller ID or 0x0FF if error) |

The interrogation response packet (exemplified in Table 3) is a five-byte packet providing status information of the handheld game controller 135 in response to a status request (interrogate packet) from the game server 110.

TABLE 3

Interrogation Response Packet

| | Data (8 bits) | Comments |
|---|---|---|
| Byte 1 | DDDDDDDD | Data 1 |
| Byte 2 | DDDDDDDD | Data 2 |
| Byte 3 | DDDDDDDD | Data 3 |
| Byte 4 | DDDDDDDD | Data 4 |
| Byte 5 | SSSSSSSS | Check sum of 1-4 (+controller ID or 0x0FF if error) |

A processor 605 (shown in FIG. 6) of handheld game controller 135 is configured to parse the polling packet, once received through RF transceiver 615, and to determine the command encoded within the polling packet. Processor 605 responds according to the command received, including, where necessary, constructing a standard response packet or an interrogation response packet. When handheld game controller 135 is receiving a data download from game server 110, processor 605 parses the downloaded packets and stores the software thus received, but does not provide a response, other than simple acknowledgement of the packets received.

The game controller driver 316 maintains an input and output buffer (exemplified in Tables 4 and 5, respectively, below) for each handheld game controller 135. The input buffer holds the last data received from the handheld game controller 135, as well as newly received data not yet parsed. The input buffer also tracks the current state of the various inputs and changes of state of those inputs. The output buffer holds the next data packet to be sent to the controller. Each input and output buffer is duplicated so that one buffer may be sending or receiving while the other is being accessed by the game server 110.

TABLE 4

Input Buffer

| | Data (8 bits) | Comments |
|---|---|---|
| Byte 1 | RRRRRRRR | Raw data 1 (unparsed data) |
| Byte 2 | RRRRRRRR | Raw data 2 (unparsed data) |
| Byte 3 | RRRRRRRR | Raw data 3 (unparsed data) |
| Byte 4 | RRRRRRRR | Raw data 4 (unparsed data) |
| Byte 5 | CCCCCCCC | Controller ID |
| Byte 6 | -----SCO | S = checksum error, C = communication error, O = Online/offline |
| Byte 7 | ---TJWGD | State change: D = dpad, G = action buttons, W = sWitch, J = joystick, T = touchpad |
| Byte 8 | --TTDDDD | D = dpad, T = trigger |
| Byte 9 | ----GGGG | G = action buttons |
| Byte 10 | ---WWWWW | W = sWitch |
| Byte 11 | XXXXXXXX | X = Joystick X-axis position |
| Byte 12 | YYYYYYYY | Y = Joystick Y-axis position |
| Byte 13 | -TTTTTTT | T = Touchpad |

TABLE 5

Output Buffer

| | Data (8 bits) | Comments |
|---|---|---|
| Byte 1 | IIIIIII | Arena ID |
| Byte 2 | CCCCCCCC | Controller ID |
| Byte 3 | MMMMMMMM | CoMMand |
| Byte 4 | 11111111 | Data 1 |
| Byte 5 | 22222222 | Data 2 |
| Byte 6 | 33333333 | Data 3 |

Figure 4:
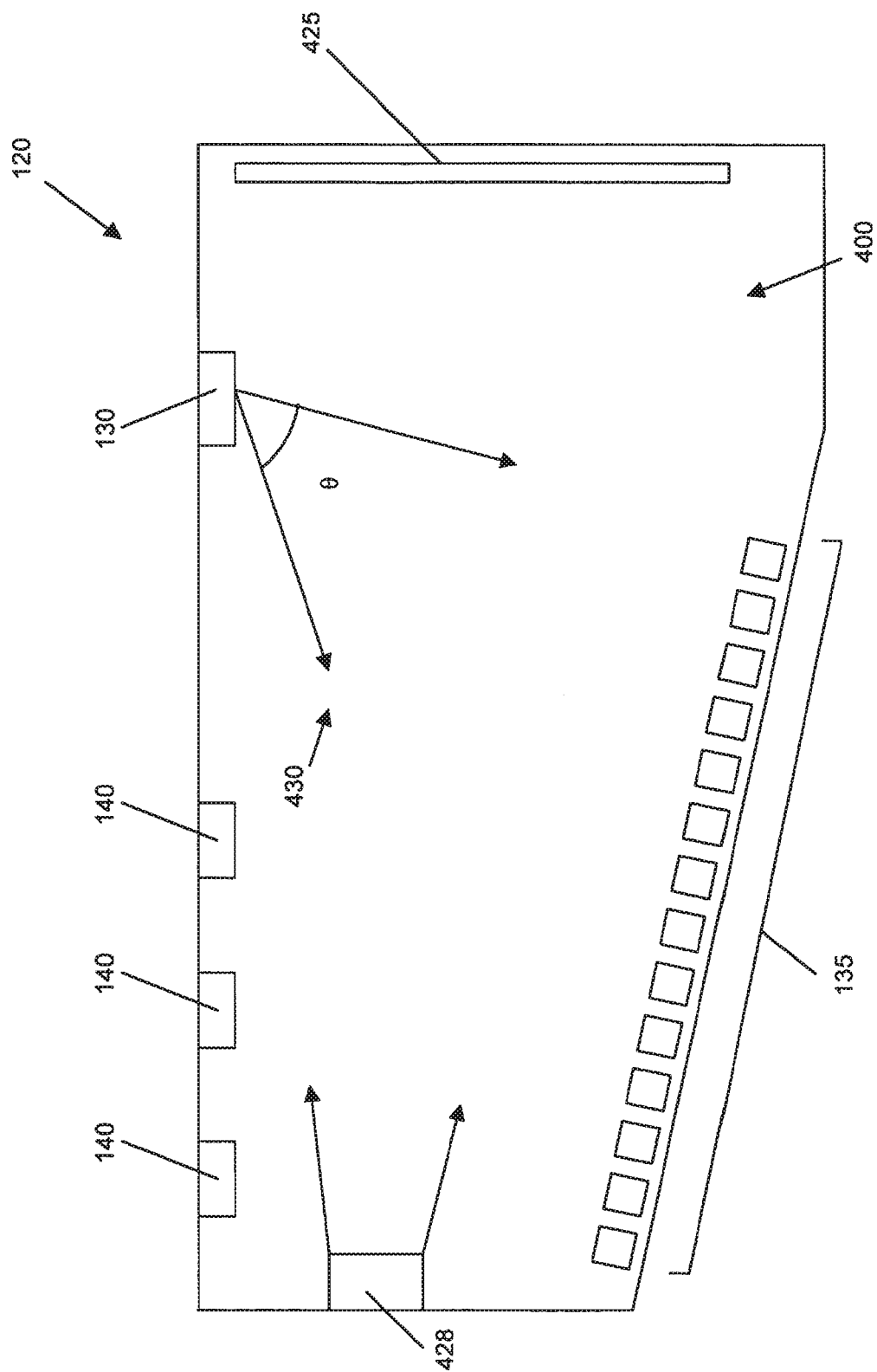
FIG. 4 is a side schematic view of a game arena according to another embodiment of the invention.

As shown in FIG. 4, game arena 120 has located therein wireless transmitter 130, wireless receivers 140, a plurality of handheld game controllers 135 and display system 125 (which comprises projector 428 and display screen 425). These components of game arena 120 are disposed at various locations around screening area 400.

Wireless transmitter 130 is preferably located on or near a ceiling of the screening area and has a targeted directional broadcast 430 generally directed towards the seating areas of screening area 400 where players are likely to position themselves while playing the multi-player game. A beam angle θ of directional broadcast 430 is preferably about 45 degrees to 90 degrees, depending on the physical configuration of screening area 400 and location of wireless transmitter 130. Broader or narrower broadcast angles can be used to accommodate more unusual configurations of screening area 400.

Wireless receivers 140 are preferably spaced apart along the ceiling of screening area 400 in several positions for receiving output signals from wireless transceivers of handheld game controllers 135. One or more wireless receivers 140 may also be located on a back or side wall of screening area 400, if considered desirable for optimizing signal-to-noise characteristics at the wireless receives 140.

Screening area 400, as exemplified in FIG. 4, may take the form of a cinema or auditorium or another kind of large enclosed space. In such a screening area, it is common to have projector 428 located toward or behind a back wall of the screening area 400 so that the images projected therefrom are directed toward display screen 425 at the front of screening area 400. Alternative locations of projector 428 may be employed, however, to suit the physical layout of screening area 400. For example, projector 428 may be mounted on a structure suspended from the ceiling or protruding from the floor.

In one embodiment, it is preferred to locate the wireless transmitter 130 generally towards the display screen 425, with the directional broadcast 430 being directed somewhat away from the display screen 425, such that the beam angle θ is directed generally downwardly and toward the back of screening area 400. In this arrangement, wireless receivers 140 are located toward the back of screening area 400 so as to be out of a direct line of sight of directional broadcast 430 from wireless transmitter 130. In this arrangement, wireless transmitter 130 is preferably located within one third of the ceiling area of screening area 400 closest to display screen 425, while wireless receivers 140 are preferably located within one half of the ceiling or side wall area of screening area 400 toward the projector 428.

In an alternative embodiment, wireless transmitter 130 may be located toward the back of screening area 400 and have directional broadcast 430 oriented generally toward the front and downwardly (but still directed to the seating area where the handheld game controllers will be located during play). With such an arrangement, wireless receivers 140 are located in closer proximity to display screen 425 and generally away from wireless transmitter 130.

In the various embodiments, the precise location of wireless transmitter 130 and wireless receivers 140 within screening area 400 will depend on the physical configuration of screening area 400 to be used in multi-player game system 100. Keeping in mind the need for direct and efficient communication from wireless transmitter 130 to handheld game controllers 135 positioned within a screening area 400 and for a fast and efficient communication from handheld game controllers 135 to wireless receivers 140, some variation or modification of the positioning of the wireless transmitter 130 and wireless receivers 140 may be made.

Figure 13:
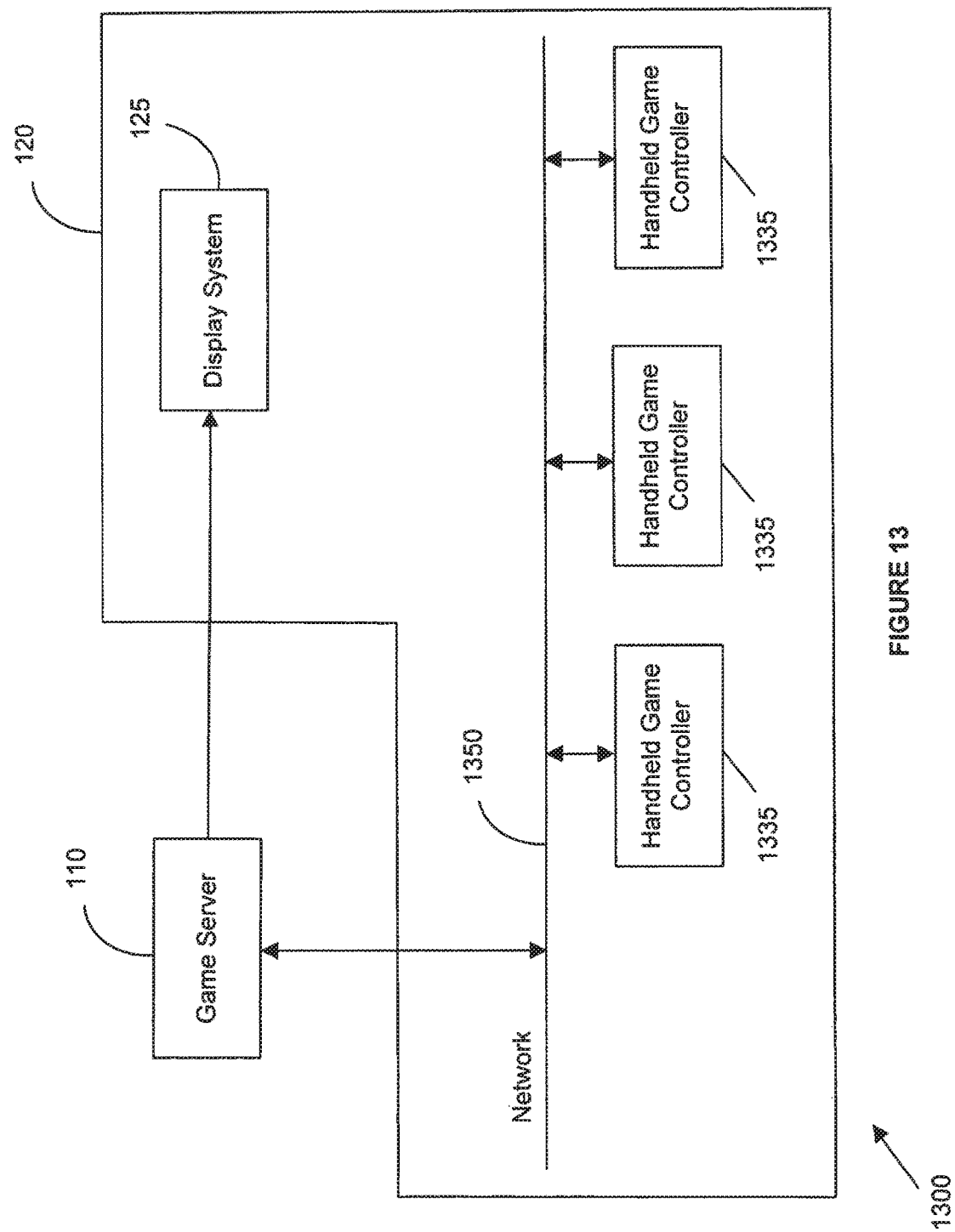
FIG. 13 is a block diagram of a multi-player game system, according to another embodiment of the invention.

In an alternative embodiment of the multiplayer game system, designated by reference numeral 1300, the handheld game controllers may be in communication with game server 110 in a wired manner, such as is shown in FIG. 13. Communication between the handheld game controllers and the game server 110 may be performed over a wired network 1350, such as an Ethernet.

Multiplayer game system 1300 is substantially the same as, and operates in a substantially similar manner to, multiplayer game system 100. However, multiplayer game system 1300 uses a wired system architecture, instead of the wireless architecture of multiplayer game system 100. As multiplayer game system 1300 interconnects game server 110 with the handheld game controllers via a network 1350, there is no need for wireless transmitters and receivers to be located in game arena 120.

The handheld game controllers are designated in FIG. 13 by reference numeral 1335, as they are slightly different to handheld game controllers 135 (described in more detail in relation to FIGS. 6 and 7) in that they do not require a wireless transceiver. Instead, handheld game controllers 1335 rely on a wired connection, such as an Ethernet connection, to network 1350. The wired connection between network 1350 and each handheld game controller 1335 is established through wiring running to each playing station, which in the preferred embodiment is a seat having at least one arm rest. The Ethernet connecting cable preferably passes through the armrest and through a mechanical connection which connects the handheld game controller 1335 to the armrest. This mechanical connection may be rigid or flexible.

As the Ethernet connection through network 1350 provides inadequate voltage to power the handheld game controller 1335 during operation of the multiplayer game, handheld game controllers 1335 use a battery power supply when the handheld game controllers 1335 are in use. When the handheld game controllers are not in use, the battery is trickle-charged through the Ethernet connection.

It should be understood that the multiplayer game system 1300 can be substituted for multiplayer game system 100 in relation to the various embodiments described herein, without affecting any of the multiplayer game operations. The primary affect is to the communications between the game server 110 and the handheld game controllers, which is primarily a matter of communications architecture and hardware.

Advantageously, multiplayer game system 1300 obviates the necessity to guard against interference between adjacent game arenas 120, as it does not use wireless communications. On the other hand, multiplayer game system 1300 may be more costly to install in an existing arena, such as a movie theatre, because of the greater structural interference required to install the wired communications infrastructure, compared to the wireless infrastructure of multiplayer game system 100.

Figure 5:
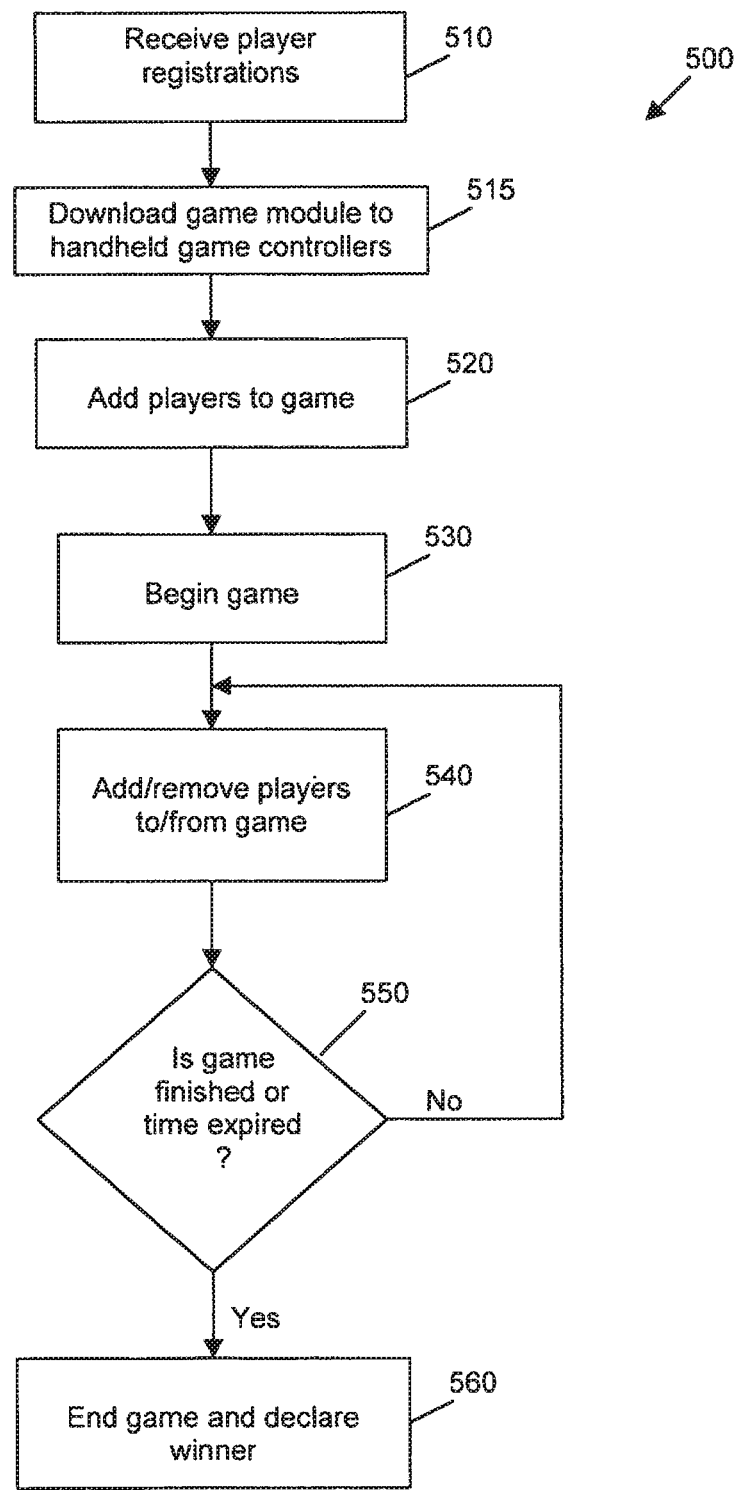
FIG. 5 is a process flow diagram of a method of multi-player gaming according to another embodiment of the invention.

Referring now to FIG. 5, a method 500 of conducting a multi-player game is described. Method 500 begins at step 510, at which player registrations are received. Player registrations are received as a result of players indicating (i.e. through appropriate input commands on a handheld game controller 135) their interest in playing a particular multi-player game. Player registration also involves receipt of payment or payment authorization or other means of receiving payment from a player. Player registration is described in further detail below, in relation to FIG. 12.

Once players have registered to play the multi-player game, a game software module is downloaded from game server 110 to the handheld game controller for which a player is registered, at step 515. This game software module is used to facilitate corresponding game activities on the handheld game controller 135 during play of the multi-player game or activities for the player to undertake prior to joining the multi-player game. In an alternative embodiment, step 515 may be performed before step 510 so as to pre-load all of the handheld game controllers 135 with the game software module before initiating the player registration procedure.

Once player registration is complete and the game software download is accomplished, registered players are added to the game at step 520. Depending on the number of registrations received and any predetermined limits on the number of players that may participate in the multi-player game to be played, the first players to register, up to a predetermined cut-off number, will be added to the game. Players registered subsequent to the cut-off number may be provided with an alternate activity while waiting for entry into the game. The cut-off number may be, for example, from 20 to 100 players, depending on the type of game and number of registered players.

Once a sufficient number of registered players have been added to the game at step 520, the game begins at step 530, with only those players added to the game at step 520 being allowed to participate in the multi-player game.

During the course of the game, the avatar controlled by a player will usually suffer some kind of gain or loss, depending upon its experiences within the game, as affected by the other player's avatars and dictated by the game software 310. If an avatar suffers a certain amount of loss or experiences certain predetermined events, the avatar may "die" or otherwise be removed from the multi-player game, in which case the player is no longer an active player in the multi-player game and the player's avatar is no longer visible on the large display screen 425.

Addition and removal of players to and from the game occurs at step 540 whereby, when a player is removed from the game, another player may be added to the game in his or her place. Players registered to play but not yet added to the multi-player game are placed in a queue so as to be added to the multi-player game once other players are removed therefrom. Players removed from the game may join the end of the queue. The first player in the queue is allowed to join the game at the next opportunity. If there are no other players ahead of a player in the queue, that player may join or rejoin the game. In this way, players may be added and removed from the game in quick succession, thus creating interest in the multi-player game while limiting the number of players in the multi-player game so as to avoid obscuring the players' avatars by overcrowding.

Once a player is removed from the game at step 540, he or she may opt to be placed in the queue to re-enter the game at the next opportunity, for example by selecting a corresponding option presented on the handheld game controller 135. Alternatively, the player may opt to perform another activity, such as playing a single player game or using the browser application available on the handheld controller 135.

In one embodiment, while a player is waiting in the queue to rejoin the multi-player game, he or she is provided with a game related activity in order to maintain his/her interest in the multi-player game. For example, this game-related activity may include performing maintenance on the avatar or exchanging or purchasing equipment or tools for a player's avatar. Alternatively, the game-related activity may include a qualification activity, such as a task or target practice, or a team set-up activity, such as selecting positions within the team (as described in relation to FIGS. 14 to 18), for example.

At step 550, game software 310 determines whether the game is finished or whether a time period allotted for playing the multi-player game has expired. If the game has finished or time has expired, the game is ended and a winner is declared at step 560. Otherwise, the game continues, repeating steps 540 and 550 until the game is finished or time expires.

The game may be determined to have finished if one of the players reaches a certain goal or otherwise achieves a winning result in the multi-player game and that player may be declared the winner. Alternatively, a winner of the game may be declared according to an accumulation of achievements or points, for example. If the game ends because of expiry of the allotted time period for the game, the player with the most accumulated points or other achievements may be declared to be the winner. If the game ends but there is further time allowed for playing the game, a new game may be started.

Handheld Game Controller

Figure 6:
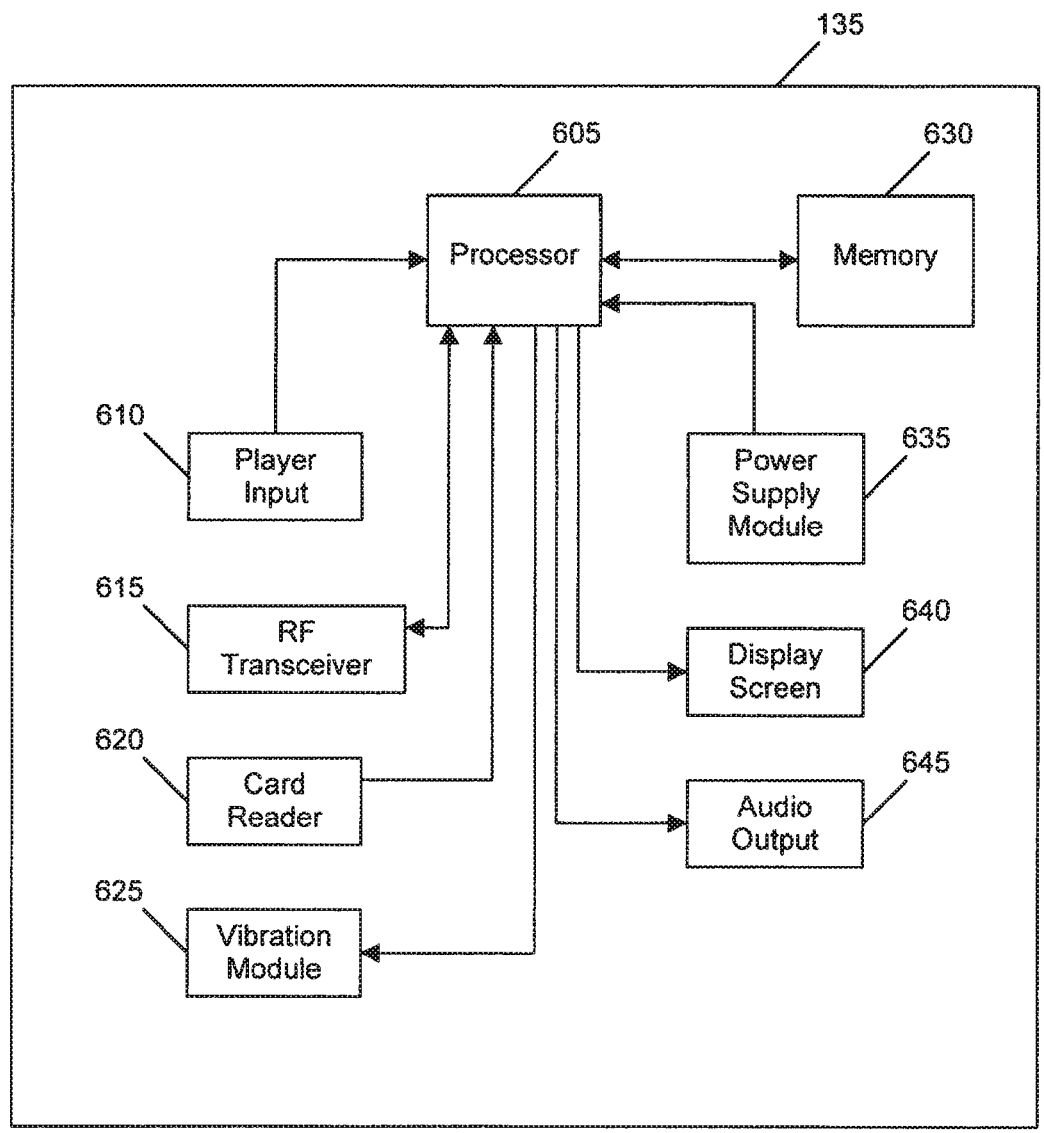
FIG. 6 is a block diagram of a handheld game controller according to another embodiment of the invention.
Figure 7:
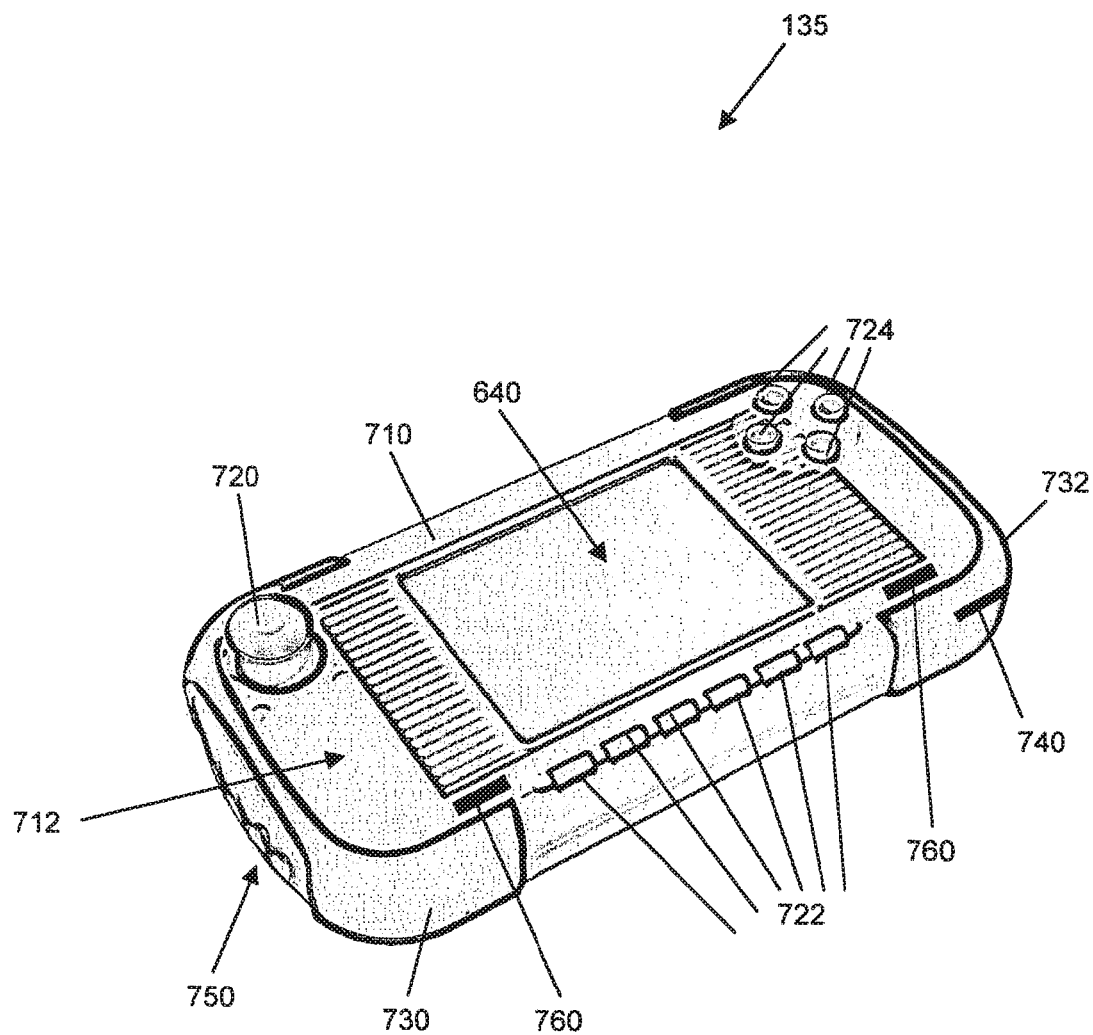
FIG. 7 is a perspective view of a handheld game controller.

Referring now to FIGS. 6 and 7, the handheld game controller 135 is described in further detail. Handheld game controller 135 comprises a processor 605 for controlling the operation of handheld game controller 135. Handheld game controller 135 further comprises player input means 610, a wireless RF transceiver 615, a card reader 620, a vibration module 625, memory 630, a power supply module 635, a display screen 640 and audio output means 645. These components are housed in a controller housing 710 (shown in FIG. 7).

Processor 605 is preferably a fast processor, capable of picture processing, sound processing and fast software algorithm execution as well as control functions and fast input and output functions. One suitable processor is a Sunplus SPG200 processor with a picture processing unit and sound processing unit (with support for NTSC and PAL data formats), which is configurable to receive data inputs from the various player-actuated input means and other inputs, such as the card reader 620 and the RF transceiver 615.

Player input means 610 includes a joystick, at least four action buttons and six to eight other command buttons. The commands and actions associated with these buttons are configurable according to the multi-player game being played. Some of the command buttons may have their functions indicated by adjacent display portions on display screen 640 so that the command buttons may effectively be used to select menu options shown on the display screen 640.

Player input means 610 preferably also includes a touch-sensitive transparent screen overlaid on display screen 640, whereby a player may select a command or option associated with a particular part of the display screen 640 by touching that part of the touch-sensitive screen overlay.

Manipulation of the various player input means, including movement of the joystick, depression of action or command buttons and touching the touch sensitive screen, cause signals to be sent to processor 605, which may be interpreted as command signals or other kinds of input signals. If the player is currently playing the multi-player game, the processor 605 processes these input command signals as necessary and encodes the commands in data packets to be transmitted to game server 110 through RF transceiver 615.

RF transceiver 615 comprises appropriate transmit and receive modules (not shown) with signal conditioning and amplification functions, as well as an antenna (not shown). The RF transceiver 615 is positioned within the handheld game controller 135 so that wireless signal transmission and reception is effected at a peripheral portion of the controller housing 710. In this way, interference of the wireless signals with the workings of other components in the handheld game controller 135 is minimized. A suitable RF transceiver is manufactured by RF Waves, with a RFW-D100 link manager for the RFW112-M transceiver and a dedicated Atmel 89c52 embedded processor.

Card reader 620 is preferably a magnetic strip card reader for reading paper or plastic cards having an encoded magnetic strip on a face thereof. Once a card is passed through or into card reader 620, so that data stored thereon can be read, the data read from the card is sent to processor 605 for validation. Alternatively, the card reader 620 may be adapted to read smart cards as well as, or instead of, magnetic strip cards.

If the coded data read from the card does not constitute a valid code, processor 605 causes an error message to be displayed on display screen 640, either instructing the player to re-insert the card in to card reader 620 or that the code read therefrom is an invalid code.

If the code read from the card by card reader 620 is determined by processor 605 to be a valid code, this code is encrypted using an encryption algorithm executed by processor 605 and transmitted to game server 110 through RF transceiver 615 and wireless receiver 140. The encryption algorithm may be, for example, a 128 bit WEP, 3DES or RSA algorithm.

Vibration module 625 comprises an offset weight driven by a small DC motor (not shown). The DC motor receives power from power supply module 635 and drives the offset weight, in a revolving manner, in response to receiving an ON signal from processor 605. The ON signal from processor 605 is preferably applied to the base terminal of a driver transistor, to effectively switch power to the DC motor in response to the ON signal. When the motor drives the offset weight, the arrangement and revolution of the offset weight within handheld game controller 135 causes the entire handheld game controller 135 to vibrate as the offset weight revolves.

Processor 605 is arranged to drive the vibration module 625 in its ON state according to a particular repeating sequence, synchronized with an enhanced visual display of the onscreen avatar on display screen 425, as part of a player character identification process (described in further detail below) actuated by the player by pressing one of the command buttons of player input means 610.

Memory 630 is used by processor 605 for storing computer program instructions comprising a game software module downloaded to handheld game controller 135 (at step 515, as previously described) and for storing application information, including, for example, a browser application, player interface software not specific to any particular game, such as an instant messaging or chat application, and game variables and data received from game server 110 during play of the multi-player game. Memory 630 comprises both volatile and non-volatile memory, including random access memory (RAM) and flash memory. Processor 605 controls the various communications, data processing display and user interface functions by executing the computer program instructions stored in memory 630.

Power supply module 635 may comprise a battery power source, for example in the form of four AA nickel metal hydride (NiMH) rechargeable battery cells, and a power supply regulator circuit, for supplying power to processor 605 and other modules. Power from power supply module 635 is controlled by processor 605 so as to provide power to other modules within handheld game controller 135 as necessary. For example, processor 605 switches power from power supply module 635 to provide lighting for display screen 640, power to audio output 645 to cause it to emit sound energy, power to drive the DC motor within vibration module 625, power to the magnetic strip reader within card reader 620 and transmission power for RF transceiver 615. Power supply module 635 may also comprise a charger circuit for recharging the battery cells from an external power source.

In an alternative embodiment, each handheld game controller 135 receives power from an external source, such as an externally mounted battery pack (not shown). In such an embodiment, the external power source supplies power to power supply module 635. The handheld game controllers 135 may each be connected to an arm of a seat or to another fixed structure in the game arena.

The battery pack is preferably removably mounted to the seat arm or other fixed structure, while the handheld game controller 135 is connected to the seat arm or other structure by means of a tether. The tether comprises a movable connection means for allowing the handheld game controller 135 to move relative to the seat arm or other structure and houses a power cable for supplying power to the handheld game controller 135 from the battery pack. The tether may comprise a rigid connecting arm or may comprise a flexible retractable cable.

Display screen 640 receives output from processor 605 to provide display images. Display screen 640 is preferably a color super-twist nematic (CSTN) screen, having 320×240 pixel screen resolution and a light emitting diode (LED) backlight.

As previously mentioned above in relation to player input means 610, a touch sensitive screen is overlaid on an outer face of display screen 640 such that the liquid crystal display unit of display screen 640 is separated from the touch-sensitive layer by an appropriate dividing layer, such as glass or transparent plastic. The "touch-screen" thus formed by the touch-sensitive layer overlaid on display screen 640 is arranged to generate an electrical output corresponding to a portion of the touch-screen touched by a player. The touch screen may have a pre-processor (not shown) for receiving the electrical signals and conditioning them, for example by analog to digital conversion, prior to outputting corresponding signals to processor 605. The electrical output from the touch screen is received by processor 605 and is processed to determine whether the player has made a valid selection of an option or game command.

Not all areas of the touch-screen will correspond to valid options or commands and some portions of the touch-screen may become active or inactive at different times, depending on the application being run by processor 605 at any given time. If the selected option or game command is valid, the selected option or command is processed by processor 605 according to the game software module (stored in memory 630) executing on the handheld game controller 135. Such processing may include generating and transmitting one or more packets corresponding to the selected option or command to the game server 110 or may involve displaying further graphics or text stored in memory 630.

The touch screen overlaid on display screen 640 may, in combination with a suitable software application executed by processor 605, advantageously allow instant messaging between the handheld game controllers 135 or 1335. This may be done by providing a user interface comprising buttons on display screen 640 which correspond to a keyboard for allowing the input of message text. The touch screen allows the buttons corresponding to the keyboard keys to be pressed. Such a user interface can be used for text messaging or to enter other text strings, such as a player name, or a team name.

If a player indicates, for example by selecting a menu option, that he or she wishes to transmit an instant message to another player, processor 605 launches an instant messaging application or otherwise provides an instant messaging user interface on display screen 640. Once a player has input the text string to be sent and has identified one or more desired recipients, for example by selecting recipients from a list or selecting a team of players to be the recipient, the processor 605 encodes the text string in one or more packets and transmits the packets to game server 110. Game server 110 then identifies the handheld game controllers 135 corresponding to the intended recipients of the text message, prepares one or more packets containing the text string, together with any other relevant information, such as the sender name, subject, etc., and transmits the packets to the relevant handheld game controllers 135 for display on the respective display screen 640. In this way, a player may communicate to any other player in the multiplayer game, including opponents, allies or prospective allies.

In an alternative embodiment, processor 605 may execute a chat room application for enabling players or other people not participating in the multiplayer game to chat, for example about the game or about an upcoming film. The chat room application uses a similar user interface to that of the instant messaging application. In particular, the chat room application requires a keyboard to be displayed on display screen 640 which, through the touch screen, can be used to input text strings.

Display screen 640 is also used by processor 605 in the player character identification process (described in further detail below in relation to FIGS. 8 to 11), whereby processor 605 causes display screen 640 or a portion thereof to flash synchronously with the vibrations caused by vibration module 625 and sounds emitted from audio output 645.

Audio output 645 comprises at least one speaker for outputting sounds corresponding to certain game events. The sounds emitted from audio output 645 vary depending on the game and the particular game events which occur during play of the multi-player game. For example, sound may be emitted to warn a player that the game time is nearly expired, his or her avatar's health is low or for other scenarios in which the player is to be alerted. One or more standard 8 ohm 250 mW computer speakers may be used for audio output 645.

In FIG. 7, a perspective view of one embodiment of the handheld game controller 135 is shown. The handheld game controller 135 has a housing 710, in the form of a rigid casing, for containing the electrical and electronic components, including processor 605, RF transceiver 615, card reader 620, vibration module 625, memory 630 and power supply module 635. The housing 710 is preferably molded plastic and of a small size suitable for being lightly and easily cradled by a player's hands.

The housing 710 has a front (or upper) face 712 and a back (or lower) face (not shown). Display screen 640 is located on the front face 712 in a generally central portion of housing 710 so that, when a player holds the handheld game controller 135 in a normal (lateral) playing orientation, front face 712 faces generally upwards and display screen 640 is visible to the player.

Housing 710 includes a left grip 730 and a right grip 732 at opposite left and right lateral ends of the housing 710. Left grip 730 is preferably formed of a soft yet frictional material, such as rubber, for comfortable gripping by a player's hands during use of the handheld game controller 135. Right grip 732 is formed of the same material, but oppositely disposed and arranged for gripping by the player's right hand. Left and right grips 730, 732 cover the left and right ends of housing 710 while leaving front face 712 substantially unobscured, serving at least a partial shock-absorption function in case the handheld game controller 135 becomes jarred or is dropped.

Player input means 610 is provided in the form of a movement selection member, such as a joystick 720, command (or option) buttons 722 and action buttons 724, as well as a touch sensitive screen overlaid on display screen 640. Joystick 720 is located adjacent left grip 730 in a position suitable for manipulation by a thumb of the left hand when the hand is placed on grip 730 so that the fingers support the lower face of the housing 710 and the thumb may contact the front face 712.

Joystick 720 is preferably anchored in housing 710 so as to be moveable in any direction through 360 degrees on an X-Y plane. Alternatively, joystick 720 may be anchored so as to only be moveable into predetermined discrete positions on the X-Y plane, for example corresponding to divisions of 45 degrees within the maximum possible 360 degrees. Joystick 720 is preferably spring-loaded to return to an upright position after deflection by a player in a desired direction. Further, the joystick 720 preferably has a soft yet frictional material disposed on, or covering, the top surface thereof, for comfortable gripping and easy manipulation by the player.

Action buttons 724 are preferably disposed adjacent right grip 732, in a position such that they may be easily depressed by a right thumb of the player's right hand when the palm of that hand is placed on right grip 732 and the fingers of that hand support the housing 710 on its back face. Four action buttons 724 are shown in FIG. 7, although it should be understood that greater or fewer numbers of action buttons 724 may be provided on handheld game controller 135. However, for minimum functionality, at least two action buttons 724 should be provided. Each action button 724 will generally provide a different player input command during play of the multi-player game.

Command (or option) buttons 722 are preferably provided adjacent display screen 640 and intermediate of left grip 730 and right grip 732, as shown in FIG. 7. The command buttons 722 are preferably disposed along an outer (upper/front) edge of housing 710. There are preferably six command buttons 722 provided adjacent to a lower edge of display screen 640 so that, by their proximity to display screen 640, they may visually correspond to menu options provided along a lower portion of display screen 640. Instead of being disposed adjacent the lower edge of display screen 640, command buttons 722 may be disposed along an upper edge thereof, or even along a right or left edge thereof.

In FIG. 7, command buttons 722 are shown disposed on a side of housing 710 opposite to a side on which action buttons 724 and joystick 720 are disposed, although command buttons 722 are disposed more centrally of housing 710 and action buttons 724 and joystick 720 are disposed more toward opposite ends of housing 710.

In the embodiment shown, right grip 732 has a slot 740 disposed therein for receiving a card in card reader 620. Card slot 740 is arranged so that a magnetic strip card may be received therein in a swiping action, so that card reader 620 can read data encoded in the magnetic strip on the card. Alternatively, the slot 740 may be disposed in another side of the handheld game controller 135, such as the far or near side edges intermediate the left and right lateral side edges.

In the embodiment shown, left grip 730 has a connector portion 750 therein for receiving a battery recharger or other form of external power supply. Connector portion 750 may be located on another part of the handheld game controller 135, according to the particular desired casing design. For example, the connector portion 750 may be located on the top, bottom or right side or on the lower face of the handheld game controller 135.

Speakers 760 are provided within housing 710 for providing audio output 645. While the location of speakers 760 on housing 710 may vary according to design requirements, it is preferred that they be located on front face 712 in a position where they will not be covered by a player's hands when the player's hands are placed on or around grips 730 and 732.

Advantageously, handheld game controller 135 may be operated in a lateral orientation, where a player's left and right hands are placed around the left and right grips 730, 732, as described above, or in a longitudinal orientation. In the longitudinal orientation, handheld game controller 135 is held by the player so that left grip 730 and right grip 732 are oriented in a longitudinal direction, with left grip 730 being closest to the player and right grip 732 being further from the player. In such an orientation, the player's left hand remains generally positioned on left grip 730, while the player's right hand is moved more centrally so that the player's fingers support the back face of housing 710 underneath display screen 640 and the thumb of the player's right hand is positioned to be able to press command buttons 722. The player's left hand continues to be positioned so as to manipulate joystick 720 by the left thumb. In the longitudinal presentation, display screen 640 is also oriented longitudinally.

Depending on the particular game or other function to be performed by the handheld game controller 135, it may be preferable to operate the handheld game controller 135 in the longitudinal orientation, rather than the lateral orientation. However, handheld game controller 135 is generally intended for use in the lateral orientation.

Player Avatar Identification

Figure 8:
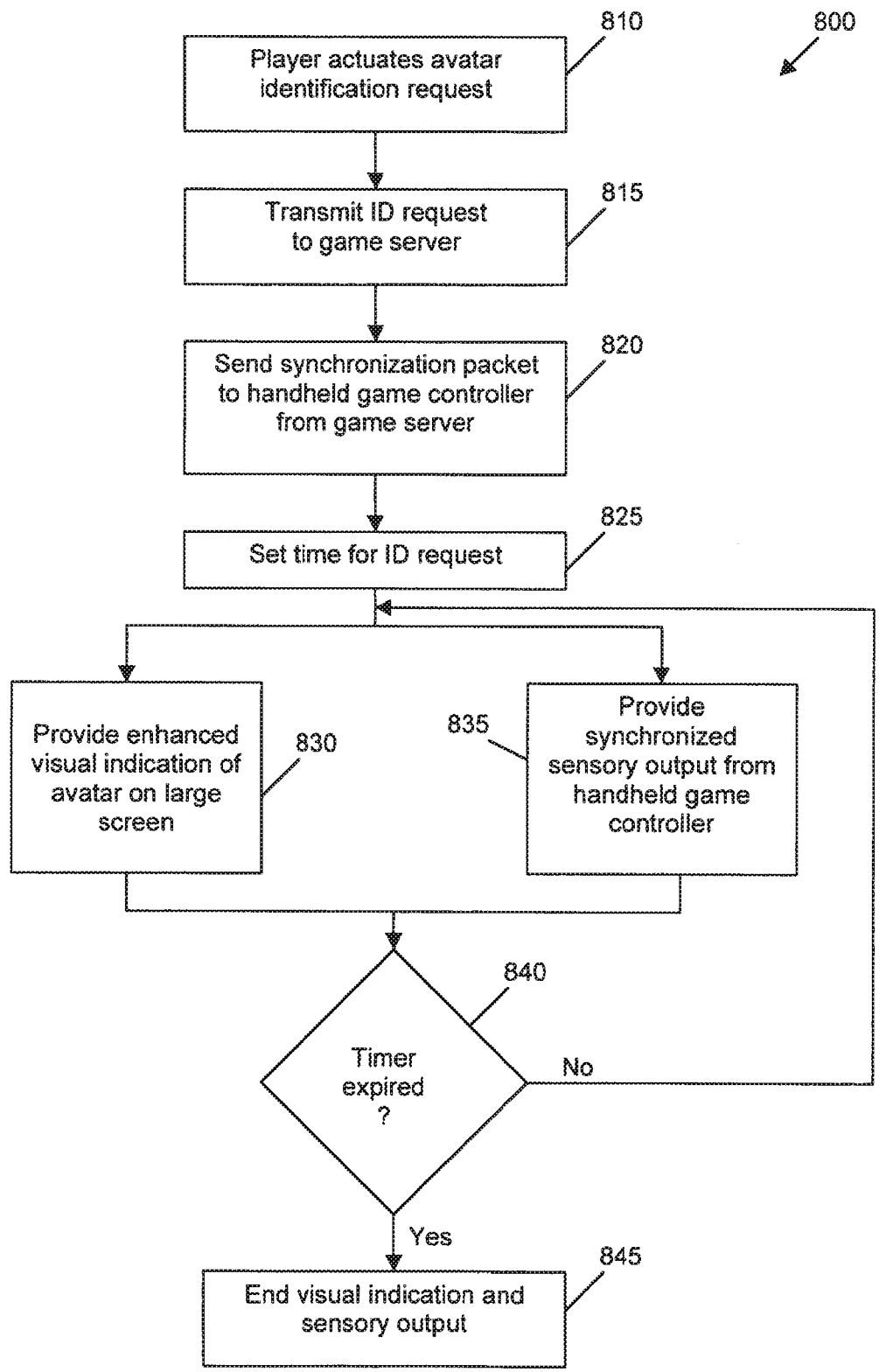
FIG. 8 is a process flow diagram of a method of avatar identification according to another embodiment of the invention.

Referring now to FIG. 8, a method of player character (or avatar) identification 800 is described. Avatar identification is initiated by the player, at step 810, by pressing one of the command buttons 722. Alternatively, a dedicated action button 724 may be provided for actuating the avatar identification request. Advantageously, the player may actuate the avatar identification request at any time the player chooses. This function is particularly helpful to the player in situations where a large number of avatars are present on the primary display of the multi-player game or, for example, where the player's avatar has become engaged in combat with another avatar and the player becomes confused as to which avatar it is that the player controls.

In response to a player actuating the avatar identification request on the handheld game controller 135, processor 605 transmits an avatar identification request packet to the game server 110, at step 815. In response to receipt of the avatar identification request packet from the handheld game controller 135, game server 110 sends a synchronization packet back to handheld game controller 135, in order to synchronize display of an enhanced visual representation of the avatar on the large display screen 425 with sensory output from the handheld game controller 135. The synchronization packet specifies a particular repeating sequence to be output as vibration-by-vibration module 625, sounds from audio output 645 and as a repeating visual display (for example, such as one or more flashing icons) on display screen 425.

At step 820, the game server sets a time period for providing the visual indication and corresponding synchronized sensory output by which the player can recognize his/her corresponding avatar on the display screen, at step 825. This time period is notified to the handheld game controller 135 by inclusion of appropriate data in the synchronization packet.

At step 830, an enhanced visual indication of the avatar (corresponding to the handheld game controller 135 from which the avatar identification request packet originated) is displayed on display screen 425. This enhanced visual indication may be provided in any of a number of ways, including, for example, repeatedly enlarging and shrinking the image of the avatar according to the particular repeating sequence or providing a flashing pointer, halo or icon above, below or otherwise adjacent to the avatar. In a further example, if a player has registered a user name or a team name, that name may temporarily appear or flash above, below or otherwise adjacent to the avatar on display screen 425.

Simultaneously with step 830, step 835 is performed, in which a synchronized sensory output is provided to the player from handheld game controller 135. This sensory output includes a repeating vibration sequence corresponding to the repeated flashing or other enhanced visual indication on display screen 425. Additionally, the sensory output includes a repeated sound sequence corresponding to the vibration sequence and flashing visual indication on display screen 425. Optionally, display screen 640 on handheld game controller 135 may flash in a corresponding repeating sequence.

The sensory output from handheld game controller 135 in a particular repeating sequence aids the player in identifying the appropriate avatar on display screen 425, as the player is able to match the repeating sequence received from the handheld game controller 135 with the visually repeating sequence on display screen 425.

Both game server 110 and processor 605 repeatedly cause the display screen 425 and handheld game controller 135 to provide the enhanced visual indication and sensory output until the time period for doing so expires, at step 840. Once the relevant time period has expired, the enhanced visual indication and sensory output is ceased at step 845 and, if the player wishes to continue to receive the enhanced visual indication and sensory output, the player must again actuate the avatar identification request at step 810 on handheld game controller 135.

In one embodiment of the avatar identification method 800, display screen 640 may display a low resolution version of the game environment in which the player's avatar is located, so as to indicate the location of the avatar relative to the game environment and the other player's avatars. In such a low-resolution display, the player's avatar may be represented by a simple icon, such as a colored block, shown relative to other avatars, represented by blocks of other colors. Alternatively, the low resolution display on display screen 640 may point out the player's avatar thereon by surrounding it with a halo, pointing to it with an arrow or otherwise providing graphics to provide an indication to the player of the avatar's location within the game environment.

The low-resolution display preferably also shows the game environment in an alternative view to that provided on display screen 425. For example, the low-resolution display on display screen 640 of handheld game controller 135 may be an aerial view of the game environment, whereas display screen 425 in game arena 120 may provide a view of the game environment from a ground-based perspective.

In this alternative embodiment, in order for handheld game controller 135 to display a low-resolution version of the game environment, it must be pre-loaded with appropriate low-resolution graphics for display when appropriate. Such low-resolution graphics may be retrieved from memory 630 at appropriate times or specifically in response to receipt of the synchronization packet from game server 110 at step 820. An example of such a low-resolution display on screen 640 is provided in FIG. 11C.

Example Game Displays

Figure 9:
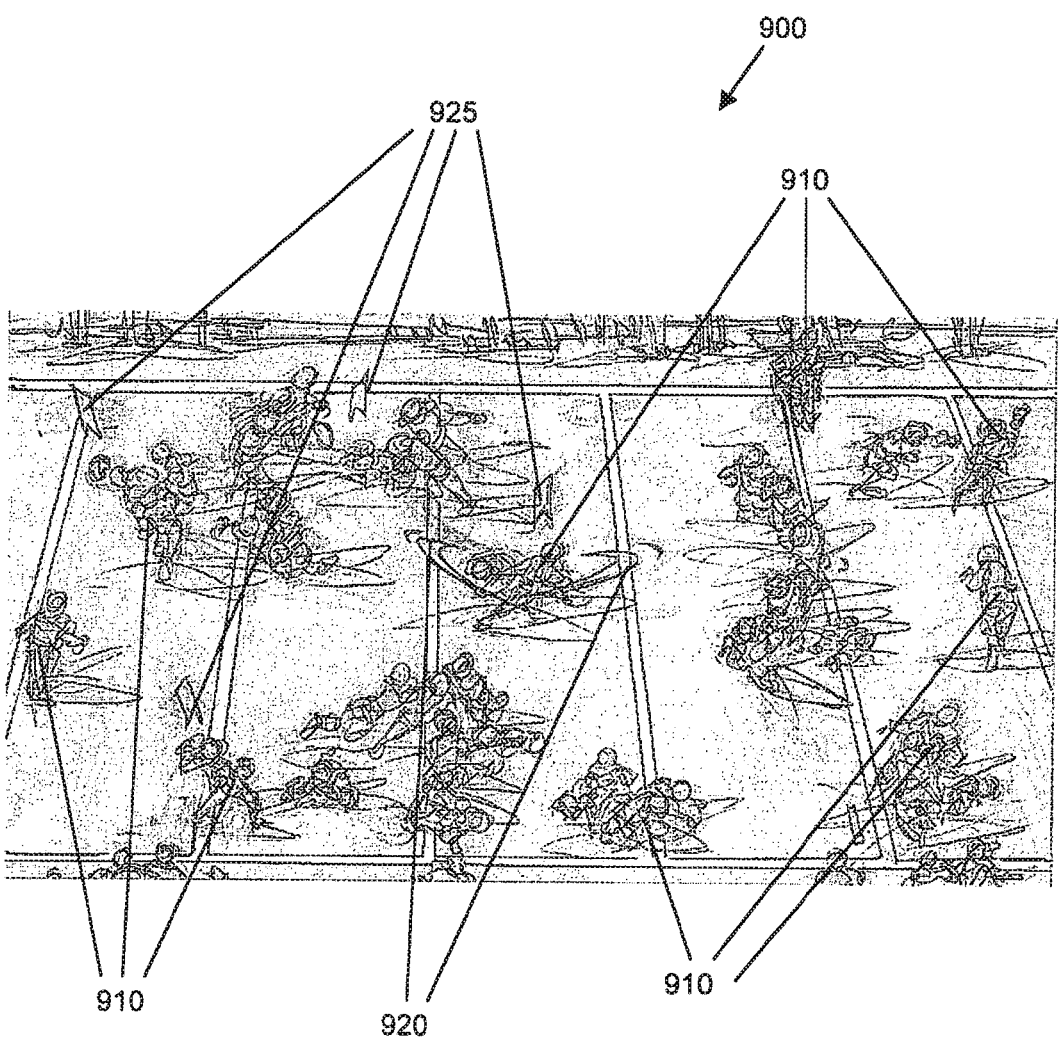
FIG. 9 is an example screen display of a primary display.

Referring now to FIGS. 9, 10 and 11A-11C, example game displays of the multi-player game are described in further detail. FIG. 9 shows an example game environment 900 displayed on large display screen 425 during play of the multi-player game. Avatars 910 controlled by players of the multi-player game are shown within game environment 900.

In the example game environment 900, many player avatars 910 are shown in the context of a sporting game. In order for a player to discern his/her avatar among the many avatars displayed, he/she may choose to actuate the avatar identification request button or option provided on handheld game controller 135 (the process for which is described above in relation to FIG. 8). In the example game environment 900, one such player has elected to actuate avatar identification request and that player's character is provided with an enhanced visual indication which, in this example, takes the form of arcuate halo icons 920 bracketing the front and back of the player's avatar 910.

In one embodiment of the multi-player game system 100, players may elect to form teams, whereby their player avatars 910 may join together and compete against other teams. In such an embodiment, the enhanced visual display provided in response to the avatar identification request may also extend to indicating player avatars belonging to the team of which the actuating player is a part. In example game environment 900, player avatars of the same team as the actuating player are shown with indicator icons 925 positioned adjacent the relevant player avatars (including the avatar of the player making the avatar identification request).

It should be understood that many different game environments may be created for facilitating multi-player games according to the methods and systems described herein. Accordingly, the present invention is not limited to any of the specific examples shown and described herein.

Figure 10:
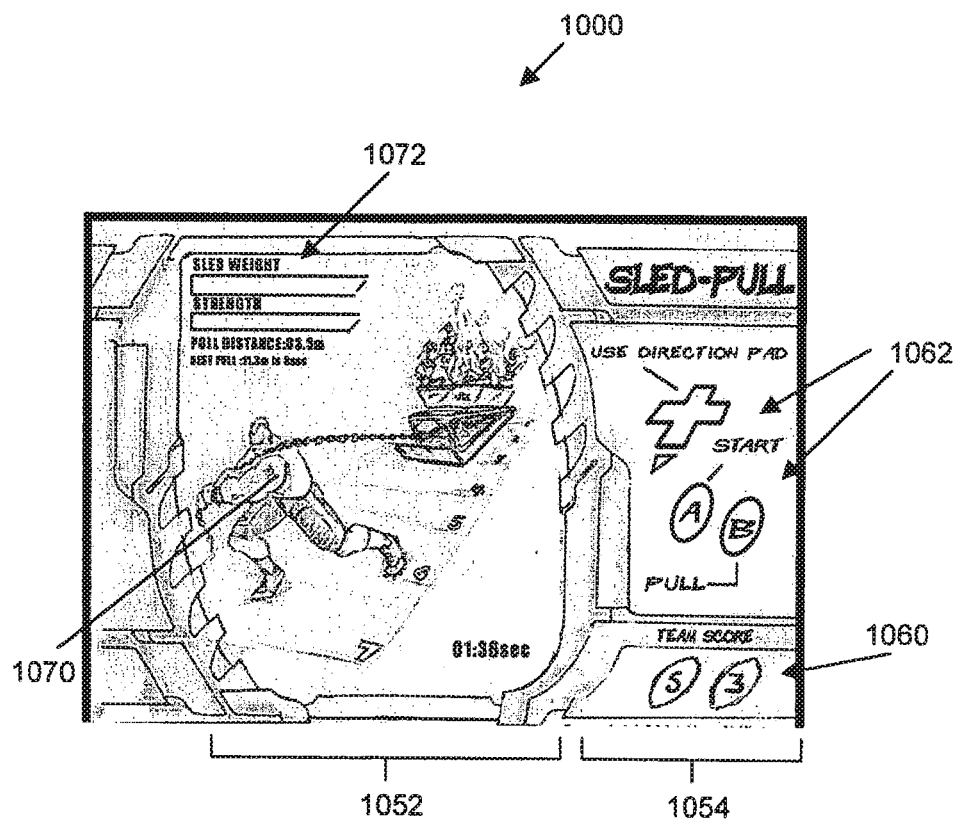
FIG. 10 is an example screen display of a secondary display.

Referring now to FIG. 10, a single player activity display 1000, as provided by display screen 640 of handheld game controller 135, is shown. Single player activity display 1000 has a game action display portion 1052 and a game information display portion 1054. The game action display portion 1052 shows a player avatar 1070 (which may be different to the player avatars shown in the multi-player game) performing an action controlled by player input to the handheld game controller 135. Player activity display portion also includes other active display elements, such as game statistics or metrics 1072. Game information display portion 1054 includes a score display 1060 and directions 1062 for performing the single player activity, preferably including graphics and appropriate icons. Score display 1060 may be an individual score or, if the player is playing as part of a team, score display 1060 may show the team score.

A player may undertake a single player activity, for example such as that depicted in FIG. 10, while waiting for entry (or re-entry) into the multi-player game or as a selected adjunct activity to be performed as one of several tasks to be completed to achieve the goals of the multi-player game.

Figure 11A:
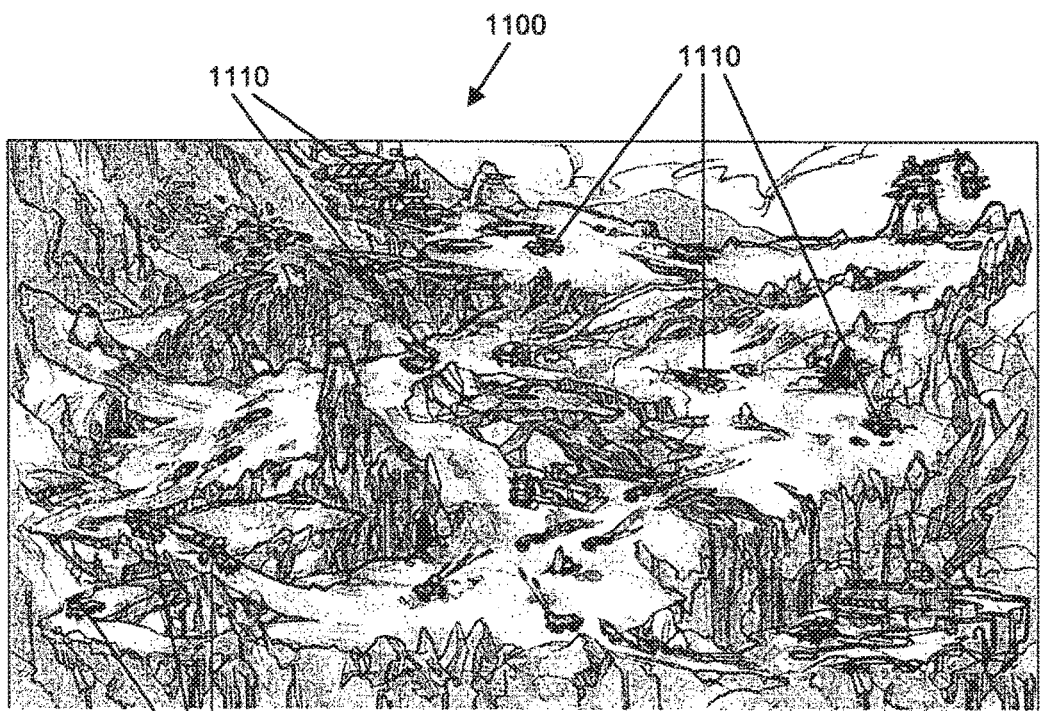
FIGS. 11A, 11B and 11C are further examples of game displays of the multi-player game, as displayed on the primary display and the secondary display.
Figure 11B:
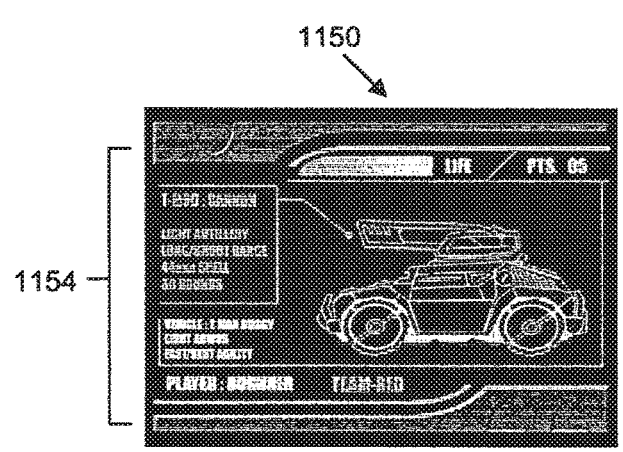
Figure 11C:
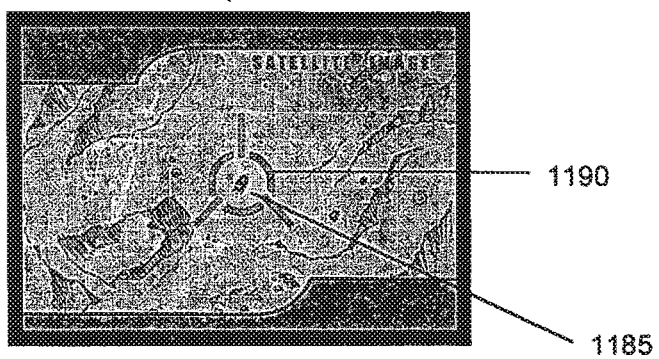

Referring now to FIGS. 11A, 11B and 11C, a further example game scenario having a game environment 1100 is shown. Player avatars 1110 move about the game environment 1100, competing with each other to achieve one or more objects of the game, for example, such as destroying each other, traversing the game environment in a certain manner or scoring points. In the example game environment 1100, each player controls an avatar in the form of a vehicle. Each vehicle has certain equipment, resources and parameters (such as life/health/condition points).

A secondary game display 1150 of the relevant equipment, statistics and condition of the player's vehicle avatar may be provided on display screen 640 of handheld game controller 135. If the player is part of a team, team information will be provided, along with the equipment, statistics and condition of the avatar 1110, as part of an information display portion 1154 of secondary display 1150. In this example, no activity display portion (like activity display portion 1052 in FIG. 10) is provided, although in alternative game scenarios, such a display may be provided as part of secondary display 1150.

Referring to FIG. 11C, a reduced resolution display 1180 may be displayed on the display screen 640 of handheld game controller 135 in response to player actuation of the avatar identification request, as previously described. In the present exemplary game environment 1100, the corresponding low-resolution display 1180 of the player's avatar 1110 provides a low-resolution icon 1185, located centrally in display 1180 and seen in aerial view within the game environment. An enhanced visual indication 1190 is provided around the icon 1185 corresponding to player avatar 1110. Simultaneously with display of low-resolution display 1180 on display screen 640, the player's avatar 1110 is shown within the game environment 1100 on large display screen 425 as having an enhanced visual appearance, such as a halo or flashing pointer or icon.

Payment Processing

In preferred embodiments, payment is received from each participating player at the multi-player game prior to that player being allowed to play the game. In an alternative embodiment, the multi-player game may be played for free. For example, where a new film is to be released in cinemas, a multi-player game having a theme similar to that of the new film may be provided in the cinema prior to release or screening of the film, for promotional purposes.

According to preferred embodiments, players wishing to play the multi-player game must pre-register to create a personal debit or credit account or purchase a pre-paid account. As an exception to this, a player may provide credit card details to a handheld game controller 135 once in the game arena 120 and, if the credit card is authorized for payment, a temporary account may be created for that player. Alternatively, credit card information may be supplied by players with personal or pre-paid accounts, in order to continue or rejoin the multi-player game after their initial credit is used up. Where necessary, payment/authentication system 220 is used to communicate with credit card authorities to effect a debit of the credit card account.

Figure 12:
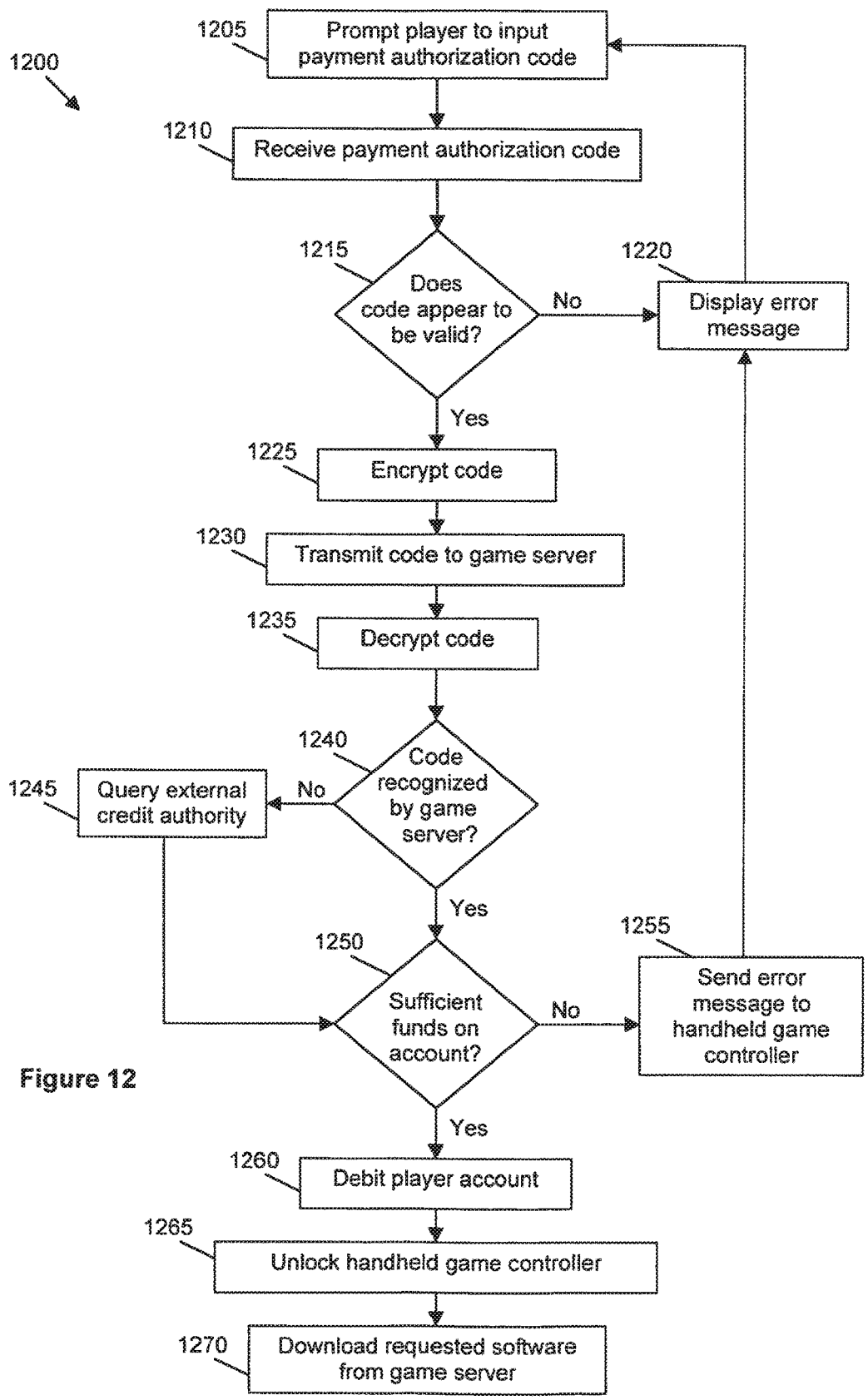
FIG. 12 is a process flow diagram of a method of player registration.

Referring now to FIG. 12, a method of player registration, including player payment processing, is described. The method of player registration is designated by reference numeral 1200 and begins at step 1205 with prompting a player to input a payment authorization code. This prompt is provided on the display screen 640 of handheld game controller 135 and allows the player to manually input a payment authorization code (for example by providing a numerical keypad on the display screen 640 so that the player can input numbers through the touch-screen) or to insert a card having the payment authorization code stored thereon into the card reader 620. The manual input of the payment authorization code may be used, for example, to input a credit card number if the card reader 620 is not able to read the credit card or to input another unique number such as a player account number.

Multi-player game system 100 is preferably set up to allow players to pre-register an account (through the administrative server system 210) either as a credit account or a debit account, so that the player can register for a game when in the game arena 120 by inputting his/her account number (or other identifying information, such as a PIN) into the handheld game controller 135 to authorize debiting of his/her player account.

As an alternative to having a pre-established registered player account, a new player may either purchase a certain amount of playing credits or playing time by inputting valid credit card details or by purchasing a pre-paid generic account. For example, the pre-paid account may have ten playing credits or a dollar value associated therewith, which any player having the account details can use to play the multi-player game. This pre-paid account may have a magnetic strip card associated therewith or a unique identification code which the player has to enter into the handheld game controller 135 as the payment authorization code in order to register for the multi-player game.

Step 1205 may be performed in response to a player attempting to manipulate, or otherwise provide input to, the handheld game controller 135, for example such as by pressing a button, moving the joystick, inserting a card into the card reader 620 or touching the touch-sensitive screen. Following display of the prompt on display screen 640 at step 1205, the handheld game controller 135 awaits receipt of the payment authorization code at step 1210.

Once the payment authorization code is received at step 1210, the code is checked, at step 1215, for validity. This validity check is used to verify that the payment authorization code is of a type that may be a valid code, for example by checking the number of digits in the code, checking that the code is internally consistent (i.e. where the code allows error detection) or for other parseable errors.

If the code received from the player is determined at step 1215 to be invalid, the handheld game controller 135 displays an error message on display screen 640 at step 1220 and the player is again prompted to input a valid payment authorization code at step 1205. If the code is determined at step 1215 to be valid, the processor 605 proceeds to encrypt the code at step 1225 using an encryption algorithm stored in memory 630. Encryption is used to provide security protection of the payment authorization code, which may contain credit card information or other sensitive information, against interception during transmission from the handheld game controller 135 to the game server 110.

At step 1230, the encrypted code is transmitted to game server 110 via RF transceiver 615, wireless receivers 140 and communications controller 115. At step 1235, game server 110 decrypts the payment authorization code using a corresponding decryption algorithm to the encryption algorithm employed by handheld game controller 135 at step 1225.

At step 1240, the game server 110 checks whether the code decrypted at step 1235 is a code corresponding to a registered account. This checking is performed by comparing the decrypted code with a database of pre-existing accounts, both those for which pre-paid accounts may be bought by anonymous users and for full player registrations having a debit or credit account.

If the decrypted code is not recognized (as corresponding to a personal or pre-paid account) by the game server 110 at step 1240, game server 110 may refer the code to an external credit authority, for example where the code resembles a credit card number, to effect a debit transaction. If sufficient funds are not in the account, either the credit card account or the multi-player game account, as determined at step 1250, then, at step 1255, the game server 110 transmits a message back to handheld game controller 135 to display an error message to the player, at step 1220. The player is then prompted to input a valid payment authorization code at step 1205.

If, at step 1250, sufficient funds are determined to be in the player's account, the relevant account is debited for a predetermined amount at step 1260. Once the player's account has been debited, the game server 110 transmits a message to the handheld game controller 135 from which the encrypted code was received that the payment transaction has been completed and to unlock the input means of the handheld game controller 135, at step 1265. Prior to step 1265, efforts by a player to manipulate the handheld game controller 135 or otherwise provide input thereto will not be processed unless that input is provided in relation to the prompt for the payment authorization code at step 1205. In this sense, the controls of the handheld game controller 135 are "locked" prior to step 1265. After step 1265, those controls become "unlocked".

Once the player's account is debited at step 1260, the player is effectively registered to play the multi-player game (or perform another selected activity). Steps 1260 to 1270 thus correspond generally to steps 510 and 515 described previously in relation to FIG. 5.

After the unlocking of the handheld game controller at step 1265, game server 110 proceeds to download one or more software modules to handheld game controller 135, at step 1270. The one or more software modules thus downloaded will generally include a game module, but may include other software modules as necessary. In a selection step (not shown), the game module is requested by the player where, in one embodiment, at least one single player game is available for selection by the player in addition to at least one multi-player game.

In an alternative embodiment, where the player is only allowed to play a particular preselected multi-player game, the step of allowing the player to select the desired game is omitted. In this embodiment, the downloading of the software modules takes place before player registration commences. The downloading can thus be performed by broadcasting the data making up the game and other software modules to all of the handheld game controllers 135 at the same time, in order to avoid unnecessarily using valuable bandwidth during the player registration process.

In an alternative embodiment, the various decryptions, account registration and debiting functions may be carried out by the administrative server system 210, instead of by game server 110. In a further alternative, some of those functions may be shared between the game server 110 and the administrative server system 210 in order to distribute processing load.

In preferred embodiments, the multi-player game system 110 is configured to allow players to select from several activities to be performed using the handheld game controller 135. One of these activities is playing a multi-player game, which is the primary purpose of the system. However, the system also advantageously allows players to entertain themselves by selecting alternative activities to the multi-player game. This allows the system to have a broader appeal than that which would be provided by only allowing a single activity to be performed.

Additionally, the multi-player game system 100 and multi-arena game system 200 may be configured to allow registered players to vote on which of a plurality of available multi-player games should be played in a game arena 120. Such a voting process may occur between steps 1265 and 1270, as described above in relation to FIG. 12.

Team Play

Referring now to FIGS. 14 to 18, further embodiments of the game are described, which particularly facilitate team play of the multi-player game. In the team play embodiments, several players share a single avatar on the main display screen 425. For example, the avatar may be a vehicle piloted and operated by the various members of the team, each using the team member's own handheld game controller 135.

Figure 14:
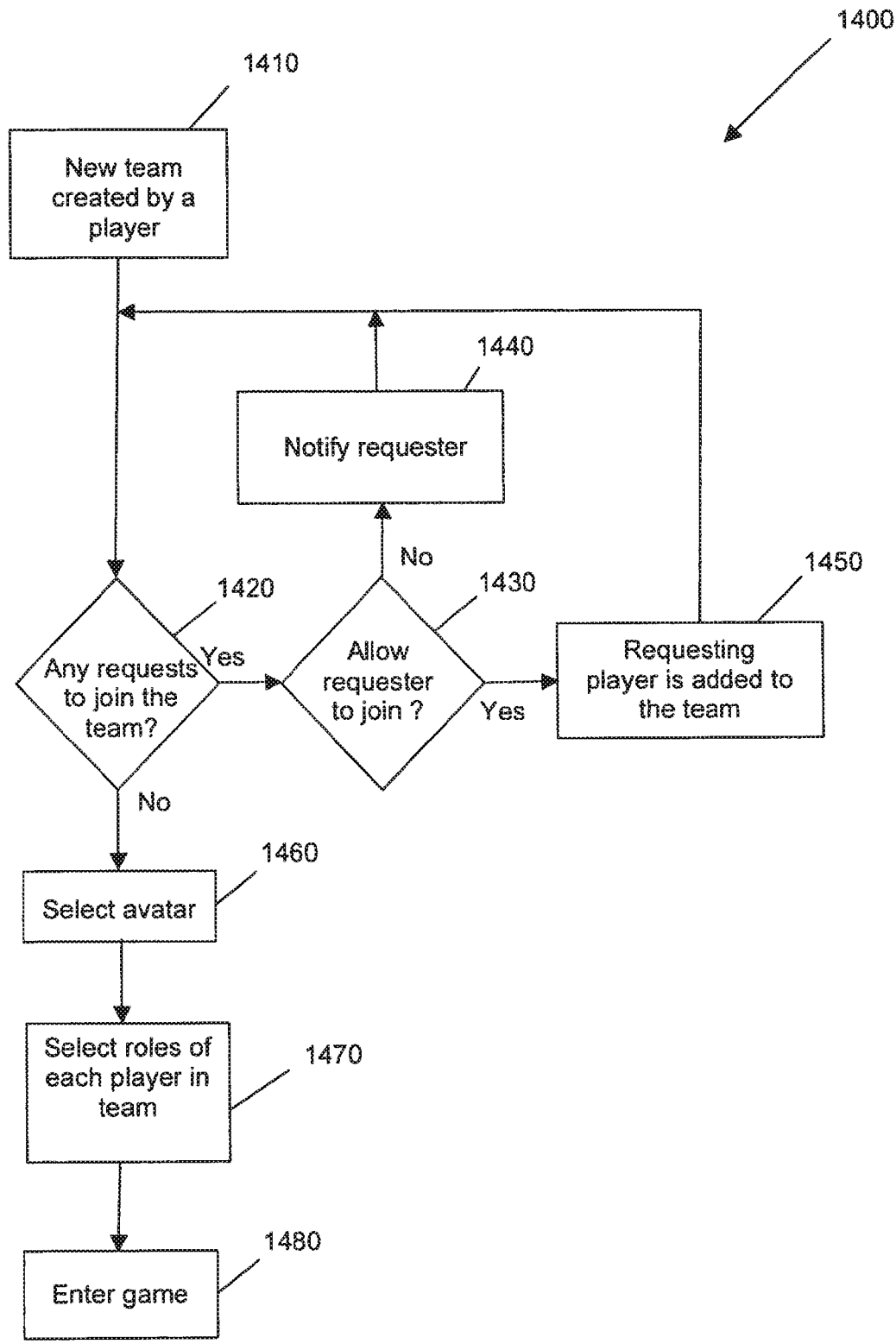
FIG. 14 is a process flow diagram of a method of facilitating team play in a multi-player game, according to another embodiment of the invention.

FIG. 14 is a flow diagram illustrating a method 1400 of facilitating team play among players of the multiplayer games. Exemplary screen displays associated with the team play embodiments of the invention are shown in FIGS. 15 to 18. These exemplary screen displays are displayed to individual players on the display screen 640 of respective handheld game controllers 135 during the team formation stage of the multiplayer game.

Figure 15:
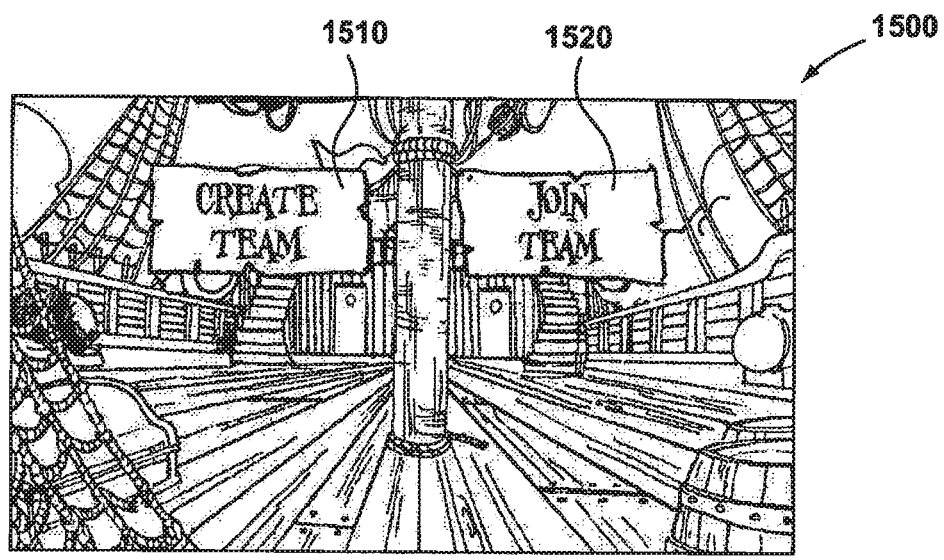
FIGS. 15 to 18 are example displays on the handheld game controller displayed during team formation.

Following registration with the multiplayer game system 100 (or 1300), a player may be provided with the option to play as part of a team or to play solo. If the player elects to engage in team play, the player is shown an initial selection display 1500, such as is shown in FIG. 15. Display 1500 provides the player with buttons (which can be selected or pressed by touching the touch screen or by using the joystick 720 to move a cursor over the desired button and pressing one of the function buttons 724) for creating a new team or joining an existing team. Create team button 1510, if selected, will cause the handheld game controller 135 to display further screens, corresponding to steps in the team formation process, such as are shown on FIGS. 16, 17 and 18. A join team button 1520, if selected, causes display screen 640 to display a list of already created teams that are open to new team members and which the player can select from to request to join.

Team formation method 1400 begins at step 1410, when a player selects create team button 1510. The player creating the team is automatically appointed to be the captain of the team and is given control over the membership and of the type of avatar which is to represent the team on the large display screen 425. The player that creates the team is also a member of the team and is allowed to choose a certain position or role within the team.

In response to selection of the create team button 1510, handheld game controller 135 asks the player to input a team name, after which the handheld game controller 135 communicates a team creation request, including the team name, to game server 110. Game server 100 then creates a new team entry in a table of teams, using the team name, according to a predetermined data structure, which is described in further detail below. The team names entered in the table of teams are stored and maintained by game server 110 and are provided by game server 110 to a player that wishes to join a team, upon selecting join team button 1520.

When a player requests to join a team, at step 1420, by selecting from the list of open teams, the team captain is notified of the request to join the team and a team formation display 1600 is displayed to the team captain. Display 1600 relates to team formation and provides information and selection buttons for that purpose.

Display 1600 comprises a display description field 1605, a team name field 1610 showing the team name, a team list 1620 and, if a player has requested to join a team, a join request 1630. Display 1600 also comprises a start button 1670 for enabling the team captain to indicate that team formation is complete.

Team list 1620 comprises a list of the players' names for the players that are already on the team, as well as showing empty team positions. For each player shown in team list 1620, there is a corresponding player removal button 1625 which, if selected by the team captain, will cause the corresponding player to be removed from the team. Upon removal from the team, the player removed will be notified of the removal and will be returned to display 1500.

Team list 1620 may also indicate a rank associated with a player, where the rank may be indicative of the player's experience level or previous achievements as a registered player in the multiplayer game. Greater game-related avatar attributes may be associated with high rank, thus giving a player incentive to repeatedly play the game and strive to reach a higher rank.

Join request 1630 comprises a text field notifying the team captain of the join request, text fields 1640 showing the player's name and rank, an accept button 1650 and a reject button 1660. If the team captain selected the accept button 1650 at step 1430, the join request is accepted and the requesting player is added to the team at step 1450. If the team captain selects reject button 1660 at step 1430, the player requesting to join the team is notified of the rejection of the request at step 1440 and is returned to display 1500.

The team captain views display 1600 during team formation at step 1420 when there are join requests 1630 to be accepted or rejected by the team captain. Otherwise, the team captain may choose to select an avatar for the team by viewing an avatar selection display 1700, shown in FIG. 17. Display 1700 comprises a description or instruction field 1705, a team name field 1710, an avatar image 1715, an avatar list 1720 and an avatar attribute description 1730. Team list 1720 shows the team members currently in the team and their currently allocated or chosen roles or positions within the team. Avatar attribute description 1730 includes an avatar name and lists or describes or graphically represents the game related attributes of the avatar corresponding to the avatar images 1715 currently displayed on display 1700. For example, the avatar may have certain attributes relating to speed, offensive capabilities, defensive capabilities, agility, or special abilities.

Display 1700 further comprises a back button 1750, a forward button 1760 and a select button 1770 for scrolling through various different avatar images 1715 and selecting an avatar having the desired attributes. Select button 1770 may be selected by the team captain to select the chosen avatar at step 1460 when the avatar image 1715 for that avatar is visible on display 1700.

Figure 18:
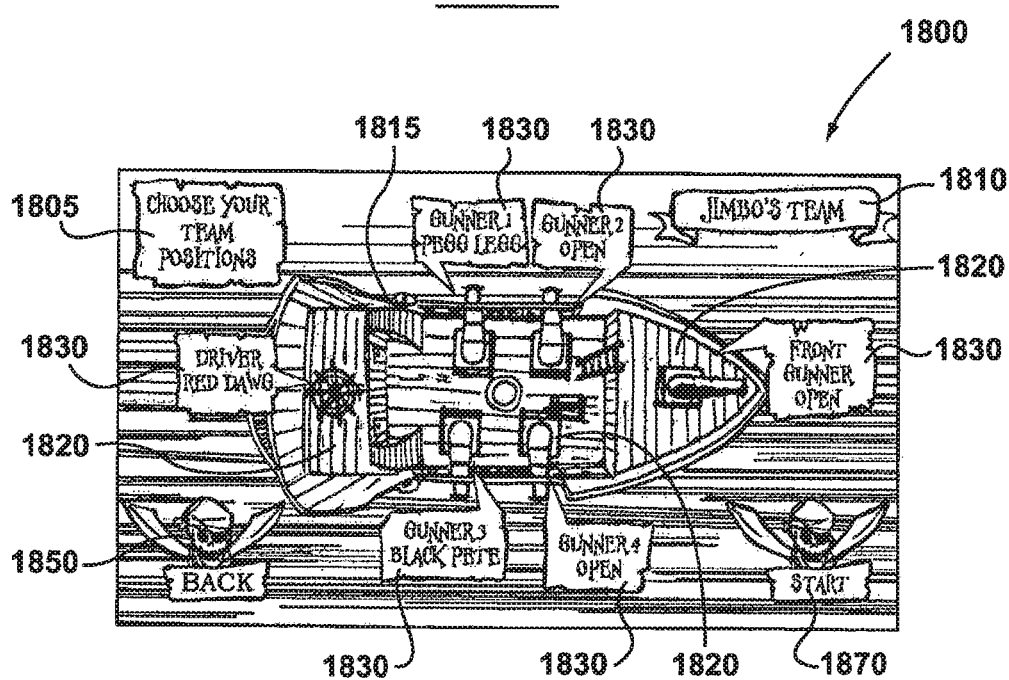

Once a team avatar has been selected, each of the team members can view a role selection display 1800, an example of which is shown in FIG. 18, and select a desired role or position 1820 on the team, at step 1470. Display 1800 comprises a text description or instruction field 1805, a team name field 1810, an avatar image 1815, a number of positions or roles 1820 located on or in relation to the avatar image 1815 and a number of text fields 1830 corresponding to the positions or roles 1820. Each role or position 1820 may be occupied by a single team member but there cannot be more team members than there are available roles or positions 1820. On the other hand, it is not necessary for all roles or positions 1820 to be occupied by a team member. Team members may opt to change roles or positions 1820 at any time during the game, although the team avatar chosen by the captain cannot be changed once the game begins. Text fields 1830 contain a description of the role or position 1820 and the name of the player, if any, occupying that role of position 1820.

Display 1800 also comprises a back button 1850 for allowing a player to return to a previous display and a start button 1870, which is visible only to the team captain, for indicating that the team is ready to play the game. When the team captain selects start button 1870 or another game initiation event occurs, such as expiry of a predetermined time limit, the team enters the game at step 1480.

Avatar image 1815 corresponds generally to the avatar selected in display 1700. Depending on the avatar selected in display 1700, avatar image 1815 may vary and may provide for varying roles or positions 1820, including varying locations or functions of the role with respect to the avatar.

As described previously in relation to FIG. 6, handheld game controllers 135 or 1335 can be used for instant messaging between players. This is particularly advantageous in a team context, in which team members may wish to send comments or instructions to other team members. As previously mentioned, instant messaging is facilitated through an instant messaging application executed by processor 605. Thus, a player may use the instant messaging application to transmit messages to teammates or other players, such as prospective teammates or opponents or prospective allies.

In one embodiment, processor 605 may also execute software which facilitates voting amongst members of a team, for example in order to select a team avatar. The voting may be initiated by the team captain or another team member. Such a voting process is performed in a similar manner to instant messaging, in that the player initiating the vote effectively initiates transmission of an instant message to each of the other team members.

When game server 110 receives a vote initiation request from a player (via that player's handheld game controller 135), game server 110 transmits a formatted message to each of the intended recipients (i.e. the initiating player's teammates) and a voting display is displayed on display screen 640, requesting the player to cast a vote. The voting display provides a number of selection buttons to enable the voting player to make a selection and initiate a response message back to game server 110 containing the selection.

Game server 110 collates the voting responses and notifies the team members of the outcome of the vote. If game server 110 does not receive a reply from each player within a predetermined time period, the game server 110 can determine the outcome of the vote without the input of some of the players. In case of a tied vote, the captain's vote may determine the outcome.

If, during the game, a team avatar dies or is otherwise removed from the game, the team avatar ceases to be displayed on large display screen 425. If the team wishes to rejoin the game, the captain may choose another avatar. Alternatively, the team may choose the new avatar through the voting process described above. In embodiments employing a single team avatar, all of the team members are removed from the game when the team avatar dies and, assuming that all players wish to remain part of the team, the team rejoins the game together with the same or newly selected avatar. As described previously in relation to FIG. 5, the game may allow for only a limited number of avatars to be displayed on the large display screen 425 at any one time. Accordingly, teams wishing to rejoin the game may have to wait in a queue before being allowed to rejoin.

In one embodiment of payment processing, each player has his or her account debited for each time the player joins or rejoins the game. Accordingly, if a team rejoins a game after being removed, each of the players on the team is debited a predetermined amount corresponding to the amount debited for joining the game or a reduced amount for rejoining the game.

While FIGS. 15 to 18 provide example displays relating to team formation aspects of the multi-player game, it should be understood that further displays may be provided as necessary in order to further facilitate team formation, avatar selection of team member roles. Further, the example displays in FIGS. 15 to 18 are shown in relation to a pirate game motif, where the team members occupy certain roles on a pirate ship, with the ship being the single team avatar visible on large display screen 425. It should be understood that other motifs or themes may be used as the basis for multiplayer gaming, including team-based participation. For example, a tank or plane of other form of vehicle may be used for the avatar within a corresponding military or other battle theme.

Alternatively, the team members may operate as a team without sharing a single avatar. For example, each team member may have a single avatar corresponding to a soldier on a battlefield or a sportsman on a sports field. In such cases, the visual and functional form of the player avatars may be dictated by their roles on the team.

Once the team has been formed, the avatar chosen and the multiplayer game begun, all of the avatars for each of the teams are displayed on large display screen 425, together with the avatar of any player who elected to play as an individual. The avatars available for selection by solo players may be different to those available to teams of players. For example, the avatars of solo players may be smaller and have less offensive or defensive capabilities than the team avatars.

Regardless of whether an avatar is representative of an individual or a team, the avatar identification functions described above in relation to FIGS. 8 to 11 operate in the same way. Further, for team avatars, each player may be visible on the team avatar according to the player's position or role within the team. Using the pirate ship example illustrated in FIGS. 15 to 18, a player may be shown to be manning a canon, for example by showing a small colored square or halo or other indicator at a canon on the avatar corresponding to the team member's location on the team avatar. During game play, team members may be able to view display 1800 on display screen 640 so that they can readily check their positions on the team avatar and can readily change positions, if necessary.

During team play, each player's manipulations of his or her respective handheld game controller 135 are encoded by processor 605 in one or more packets and transmitted to game server 110, which processes the actions of each of the players in the team separately and as part of the team.

In order to manage the team play, game server 110 implements a server side data structure, an example of which is shown in Table 6 below. The data structure comprises a team table for tracking all of the teams and a player table for tracking each player in the various teams. Each team and player has its own record in the data structure. The records in the server side data structure are updated frequently by game server 110. A corresponding data structure (of reduced size) is maintained by each handheld game controller 135 or 1335 and used in communications with game server 110.

TABLE 6

Server side data structure

| teamTable | |
| --- | --- |
| teamTotal | number of teams |
| *team1 | pointer to team1 data structure |
| *team2 | pointer to team2 data structure |
| *** | pointers to additional team structures |
| player Table | |
| player Total | number of players |
| *player1 | pointer to player1 data structure |
| *player2 | pointer to player2 data structure |
| *** | pointers to additional player structures |
| teamN | N-team number |
| teamLength | length of team data structure |
| teamName | team name |
| teamLeader | player ID of team leader |
| teamState | open/closed |
| teamVehicle | vehicle |
| teamPlayers | number of players in the team |
| teamPlayerList | list of players on the team |
| *** | additional parameters as required by game |
| playerN | N-player number |
| playerLength | length of player data structure |
| playerName | player name |
| playerTeam | team affiliation or 0 = none |
| playerPosition | player's position in team |
| playerRank | player's rank among players |
| playerScore | player's score |
| playerNode | ID number of handheld game controller used by player N |
| *** | additional parameters as required by game |

The game server 110 and handheld game controllers 135 (or 1335) communicate with each other to facilitate team formation and to govern and track progress of the game during play. Example algorithms performed by game server 110 are illustrated in Table 7 below in pseudocode. In Table 7, the term "node" refers to a handheld game controller manipulated by a player who has registered to play the game.

TABLE 7

Server routines and related game controller functions

| Server Side Routines | Game Controller Function |
| --- | --- |

```
//arena polling function - continuously transfers
//data between server and handheld game
//controllers (nodes) ... also looks for new players
//registering for the game
ServerLoop( )
{
     DO {        //forever
                 //send server game string to all attached
     nodes
                 play the game
                 //poll next vacant physical node number
                 IF //the vacant node responds//      -new node sends back an
                     NewNodeThread(node #);          acknowledge if it sees its own
                 ENDIF                                physical node number
     } LOOP;
}
```

TABLE 7-continued

Server routines and related game controller functions

| Server Side Routines | Game Controller Function |
|---|---|

```
//thread started when a new player is registered
NewNodeThread(node # )
{
    //assign a new node number to the controller
    InitNode( );
    //get player name and add to playerTable
    InitPlayer( );
    //allow new player to create or join a team
    activate create or join screen on controller          -- display create or join screen
    IF         //player wants to create a new team        (FIG. 15) - respond with
               CreateTeam( );                             controller touch screen
               PickAvatar( );                             response.
               PickPosition( );
    ELSE       //player can join a team
               JoinTeam( );
               PickPosition( );
    ENDIF
}
//routine communicates with the new controller to
//set-up its node ID
InitNode( )
{                                                         -- Acknowledge with physical
    assign controller logical node number                 node number
    send physical node number + logical node              -- store local copy of logical
number                                                    node number
}                                                         -- subsequent game query
                                                          responses all use the logical node
                                                          number.

Figure 16:
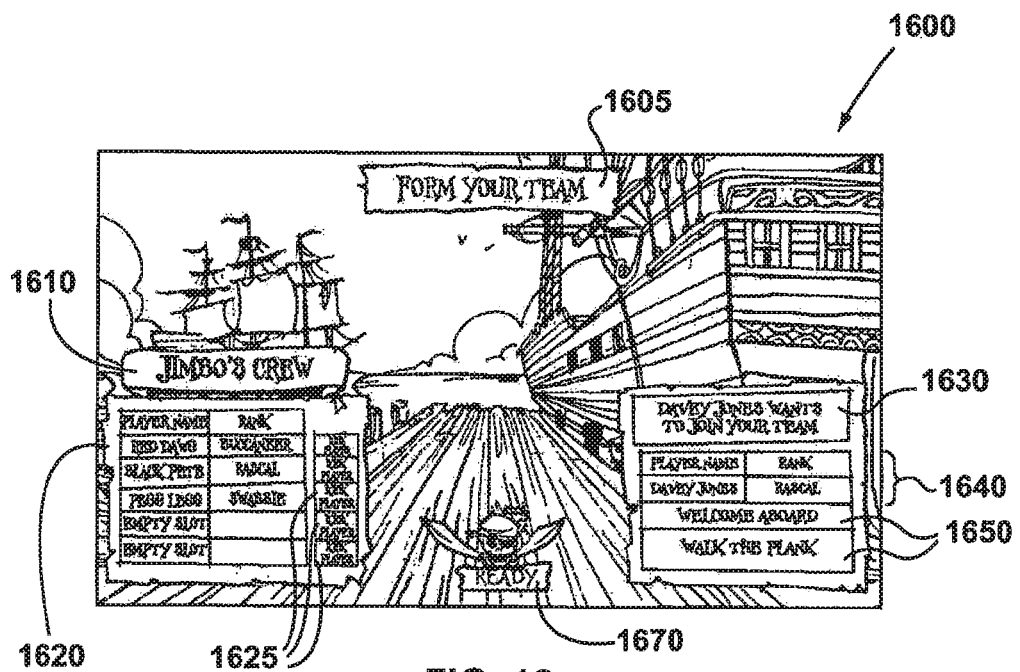
Figure 17:
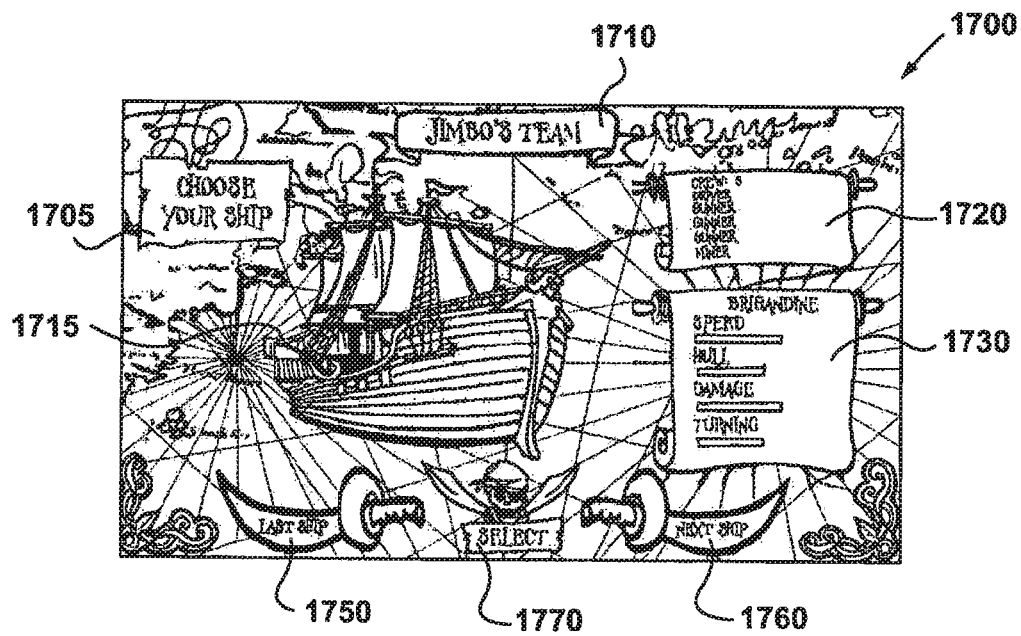

InitPlayer( )
{
    request player name from controller                   -- user inputs ASCII name or ID -
    create playerN data table                             transmit to server
    allocate pointer to playerTable
    if player ID exists in database, prefill the rank
and other information based on the player history.
}
CreateTeam( )
{
    request team name and setup info from                 --send team name.
team leader's controller
    create teamN data table - save team leader ID
    allocate new entry in teamTable
    //allow players to join
    set timeOut for ~ 5??? minutes                        -- while team is marked as open
    mark team as open                                     players can join via the
    activate Form Team display on team leader's           JoinTeam( ) server routine.
controller (Figure 16)
    DO
    {                                                     -- team leader controller shows
           - get requests to join team from               Form Team display (FIG. 16).
controllers
           - send requesting player ID and stats to
Team Leader controller
           - IF team leader accepts                       -- team leader can accept or
                  - add player info to teamN table        deny join requests
           ENDIF
    }
    WHILE                                                 -- accepted player displays
    (wait for:       timeOut, player slots full, team     partial Form Team display
leader terminates team creation)                          (cannot reject or accept - only
    mark team as closed.                                  watch)
}
JoinTeam( )
{
    send list of open teams to node                       -- respond with desired team
    wait for team request from controller
    IF request granted (in team leader
CreateTeam( ) function)
    THEN
           add player to teamN table
           send teamGranted message to node               -- show partial Form Team
           activate Form Team display on player           display similar to FIG. 16
controller                                                (cannot reject or accept - only
    ELSE                                                  watch)
```

TABLE 7-continued

Server routines and related game controller functions

| Server Side Routines | Game Controller Function |
|---|---|
|         send notGranted message to node<br>    ENDIF<br>}<br>PickAvatar( )<br>{<br>    activate first avatar screen on team<br>    member controllers<br>    WHILE (team leader selects)<br>    {<br>    get team leader response<br>        IF response is prev :<br>            go back to previous avatar<br>            activate prev avatar display on<br>team controllers<br>        IF response is next:<br>            advance to next avatar<br>            activate next avatar<br>display on team controllers<br>        IF response is select:<br>            add the avatar to teamN data<br>structure<br>    }<br>}<br>PickPosition( )<br>{<br>    activate avatar position screen on team<br>member        controller<br>    WHILE (player has not pressed start)<br>    {<br>        update open/filled positions<br>    }<br>} | <br><br><br><br><br>- display avatar on team<br>member controllers<br>- team leader can select<br>prev/next/select<br><br><br><br><br>- display previous avatar on team<br>member controllers<br><br><br><br><br>- display next avatar on team<br>member controllers<br><br><br><br><br><br><br><br><br>-- display avatar position screen<br><br><br><br>-- display open/filled positions<br>-- send touch screen response<br> |

Figure 19:
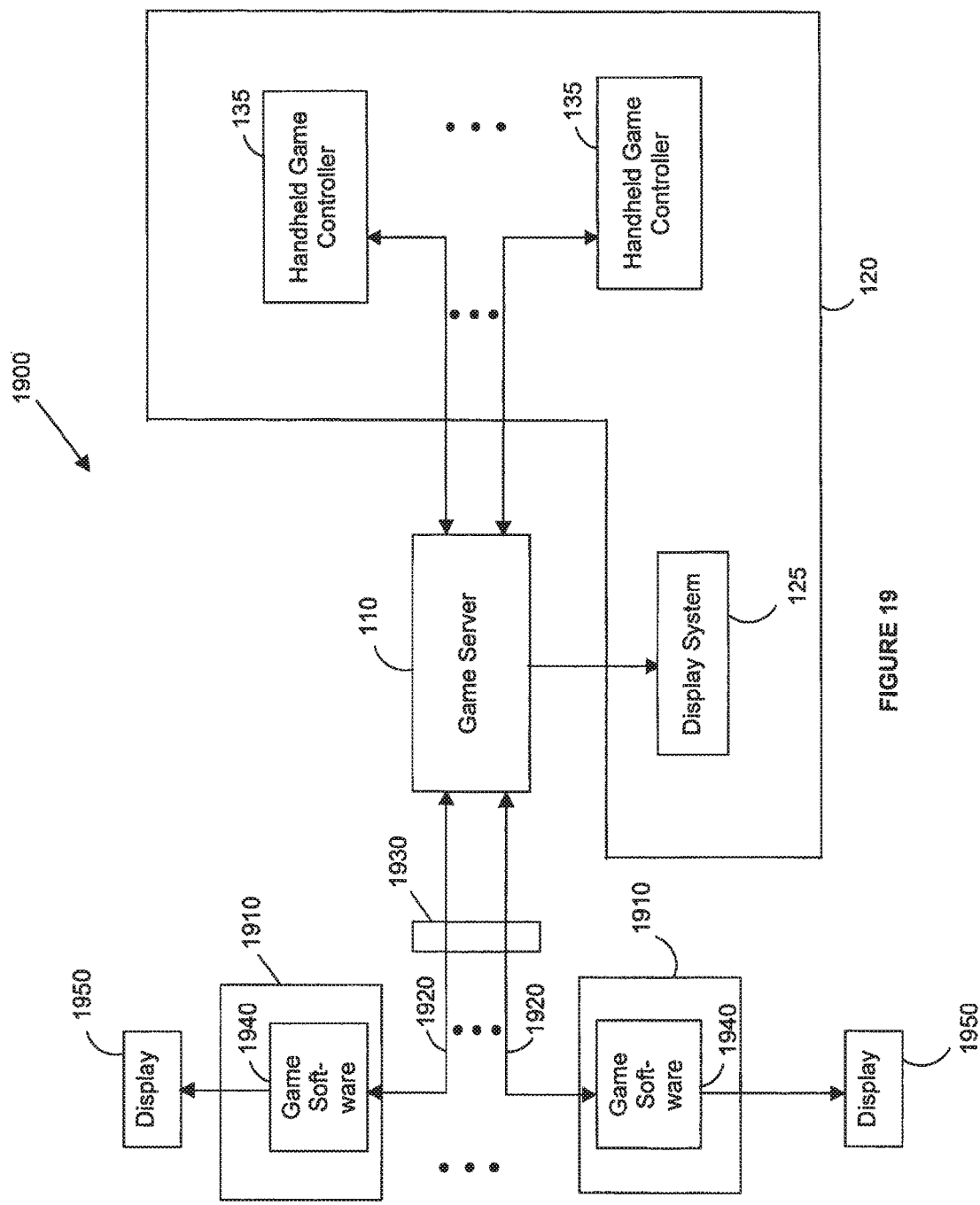
FIG. 19 is a block diagram of a multi-player game system according to another embodiment of the invention.

In another embodiment of the multiplayer game system, players are allowed to join the multiplayer game through a remote connection, without being located in the game arena. Such a multiplayer game system is depicted in FIG. 19 and designated by reference numeral 1900. In multiplayer game system 1900, game server 110 communicates with handheld game controllers 135 via communications controller 115 (not shown) as previously described in relation to FIGS. 1 to 4 and 13 and displays a primary display of the multiplayer game on display system 125. In addition to receiving game input from handheld game controllers 135, game server 110 may receive game input from remote game controllers 1910 located remotely from the game arena 120 and game server 110 over a communications connection 1920 through a network 1930.

Remote game controllers 1910 may be desktop or laptop personal computers or video game consoles, for example. Remote game controllers 1910 have game software 1940 installed and running thereon, in order to play the multiplayer game. Game software 1940 is downloaded from gamer server 110 or administration server system 210 and installed on game controller 1910 by a prospective player of the multiplayer game.

Each remote game controller 1910 has associated therewith a display 1950, for example such as a television connected to the video game console or as part of the desktop or laptop computer system, for viewing images of the multiplayer game. In order that the images on display 1950 are sufficiently current to enable real time play of the multiplayer game, the communications connection 1920 between game software 1940 and game server 110 needs to be of a relatively high speed.

In response to game-related user input into remote game controllers 1910, game software 1940 transmits data packets representative of the game related commands arising from the user input to game server 110 via network 1930. Game server 110 provides data packets in return to game software 1940 over network 1930 to update the game status and enable game software 1940 to generate updated game images for display on display 1950.

Multiplayer game system 1900 enables players to join in the multiplayer game from home or another location remote from the game arena 120 in which the multiplayer gaming mainly occurs. Players joining the multiplayer game through remote game controllers 1910 may join as solo players or may participate in a team. In one embodiment, players manipulating remote game controllers 1910 are only permitted to join the game using a single avatar, rather than a shared avatar. Such players may form a team or alliance with other players but do not share a team avatar. In such an embodiment, the game images viewed by the remote player on display 1950 correspond to the view from the perspective of that player's avatar. This first person perspective is in contrast to the global view of the multiplayer game visible on the large display screen 425 in game arena 120. Optionally, remote players manipulating remote game controllers 1910 may be able to toggle between a first person perspective and a global view.

It should be understood that game server 110 may be implemented as a server system having a large number of processors for handling the potentially large number of players that may participate in the multiplayer game.

While a number of embodiments have been described separately above, having different features, functions or characteristics, it should be understood that many such features, functions or characteristics may be incorporated in various combinations into one or more embodiments other than those in relation to which such features, functions or characteristics were particularly described. Thus, all useful and feasible combinations of any one or more such features, functions or characteristics are hereby specifically incorporated herein.

One aspect of the invention relates to a multi-player game system comprising: a game server configured to provide display signals for displaying a multi-player game and a game arena. The game arena comprises: a display system having visual display means for displaying the multi-player game in response to the display signals; a wireless transmitter in communication with the game server for transmitting game data signals within the game arena; a plurality of game controllers adapted to receive the game data signals from the wireless transmitter and to transmit command data signals corresponding to player input commands; and at least one wireless receiver in communication with the game server for receiving the command data signals from the plurality of game controllers and communicating the command data signals to the game server; wherein the wireless transmitter is disposed in an upper part of the game arena and a transmission direction of the game data signals from the wireless transmitter is generally toward the game controllers; and wherein the at least one wireless receiver is disposed in the game arena generally away from the wireless transmitter.

Each of the game controllers preferably has a display screen for displaying game images related to the multi-player game. Each of the game controllers preferably has input means for receiving player input from a player in relation to the multi-player game. Preferably, the game arena is at least partly defined by a large enclosure.

The input means may comprise a touch-sensitive screen. The input means may comprise a movement selection member and a plurality of buttons. The movement selection member may be a joystick. The input means may comprise a card reader for receiving player authentication data. Each game controller is preferably connected to a respective fixed structure within the game arena.

Each game controller preferably has a power supply located apart from the game controller, the power supply being electrically connected to the game controller through a power supply cable and being mounted to the fixed structure.

A further aspect of the invention relates to a multi-arena game system comprising: a plurality of multi-player game systems as described above; and an administration server in communication with the game server of each multi-player game system for controlling and monitoring the operation of the plurality of multi-payer game systems.

The plurality of multi-player game systems may be located together within a single complex. Alternatively, one or more of the plurality of multi-player game systems may be located remotely from another one or more of the plurality of multi-player game systems. The multi-arena game system preferably comprises a master clock for synchronizing communications within the game arena of adjacent multi-player game systems.

A further aspect of the invention relates to a handheld game controller for a multi-player game, comprising: a display screen for displaying a first display related to the multi-player game; player input means for receiving game control input from a player of the multi-player game in relation to a corresponding avatar of the multi-player game; processor means for processing the game control input to generate first game signals and for generating the first display based at least in part on received second game signals; and a transceiver for transmitting the first game signals to a game server facilitating the multi-player game to allow the game server to generate a second display of the multi-player game based in part on the first game signals and for receiving the second game signals from the game server; wherein the second display includes the avatar and the player input means is useable by the player to control the avatar within the multi-player game.

Preferably, images of the first display are different from the images of second display. The transceiver may be a wireless transceiver. The first and second game signals are preferably respectively transmitted and received as first and second packet data. Each of the first and second data may comprise a checksum and an identifier of the game controller. The first and second packet data are transmitted during predetermined transmission periods.

The game controller preferably comprises output means for providing sensory output to the player. The output means preferably provides at least one of a vibratory, visual and auditory output. The output means preferably comprises at least one speaker and the display screen. The input means preferably comprises a touch-sensitive screen. The input means preferably comprises a movement selection member and a plurality of buttons. The movement selection member is preferably a joystick. The input means preferably comprises a card reader for receiving player authentication data.

The game controller preferably comprises a casing housing the display screen, the player input means, the processor means and the transceiver, and a power source, the power source being located apart from the casing. The game controller is preferably connected to a fixed structure. A tether preferably connects each game controller to the fixed structure. The tether may comprise a rigid connecting arm movable between a playing position and a stowed position. Alternatively, the tether comprises a flexible retractable cable. The casing preferably has left and right grips disposed at respective left and right lateral ends of the casing when the casing is held in a lateral orientation. The display screen is preferably disposed intermediate the left and right grips. Buttons are preferably disposed on the casing along an edge of the display screen.

A further aspect of the invention relates to a method of player registration for playing a multi-player game, comprising: receiving a payment authorization code from each prospective player of the multi-player game at a respective one of a plurality of handheld game controllers; validating the payment authorization code; sending the payment authorization code to a game server that facilitates the multi-player game;

processing the payment authorization code to determine an account corresponding to the payment authorization code, the account being useable for paying for the multi-player game; debiting the account for a predetermined amount; registering the prospective player as a player of the multi-player game; and unlocking the one handheld game controller for use by the player for playing the multi-player game.

The method may further comprise, after the step of unlocking, downloading game software from the game server to the one handheld game controller to enable the player to participate in the multi-player game by manipulating the handheld game controller.

The method may be performed by a multi-player game system having a display screen arranged in a game arena and the multi-player game is displayed to players on the display screen. The game arena preferably includes the plurality of handheld game controllers, the display screen and communication means for enabling the handheld game controllers to communicate with the game server. The method preferably further comprises encrypting the payment authorization code before sending it to the game server and decrypting the encrypted payment authorization code before the step of processing.

In one embodiment, before the step of receiving, game software is downloaded from the game server to the one handheld game controller to enable the player to participate in the multi-player game by manipulating the handheld game controller.

A further aspect of the invention relates to a method of conducting a multi-player game, comprising: receiving at a game server a plurality of registration requests from respective game controllers manipulated by prospective players of the multi-player game; processing the registration requests to register eligible prospective players as registered players of the multi-player game; adding registered players, up to a predetermined number of players, to the multi-player game; beginning the multi-player game; removing one or more registered players from the multi-player game in response to one or more predetermined game removal events; adding one or more registered players to the multi-player game following the step of removing, so that the number of registered players added to the multi-player game does not exceed the predetermined number of players; and ending the multi-player game in response to one or more predetermined game end events.

The method preferably further includes displaying the multi-player game on a large display screen in a game arena housing the game controllers and the registered players. The game server and the game controllers preferably communicate via wireless communication means. The method preferably comprises allowing registered players to form a team of players and to participate in the multi-player game as a team. Each game controller preferably includes input means and the registration requests are generated based on input received via the input means. The game controllers are preferably handheld computing devices and the input means comprise a card reader and a touch screen.

A further aspect of the invention relates to a method of facilitating team play in a multi-player game, comprising: providing in a game arena a plurality of handheld game controllers having input means for receiving player input from a respective plurality of players and a first display screen for displaying game-related images; providing a game server in communication with the plurality of handheld game controllers for receiving first signals from each handheld game controller and for transmitting second signals for the handheld game controllers, the first signals corresponding at least in part to player input received at the respective handheld game controller; receiving at the game server a team creation request from a first handheld game controller in response to player input from a first player; creating a team entry in a team table maintained by the game server in response to the team creation request; adding a player entry for the first player to the team entry; receiving at the game server a team join request from a second handheld game controller in response to player input from a second player; adding a player entry for the second player to the team entry; forming a team based on the team entry; starting the multi-player game; and causing game images of the multi-player game to be displayed on a display screen visible to players in the game arena, the game images comprising a plurality of avatars controlled at least in part by the player input.

The game server and the handheld game controllers preferably communicate via wireless communication means. The handheld game controllers preferably each have a display screen for displaying related images related to the multi-player game and the method further comprises displaying the related images in response to the player input. Preferably at least one of the avatars corresponds to the team and is at least partly controllable in response to player input from players added to the team entry.

Preferably, after step f), the game server transmits an authorization request to the first player in response to the team join request and step g) is only performed if a team join authorization is received by the game server from the handheld game controller of the first player. The game server preferably performs steps f) and g) until the game server determines that the team is complete.

The game server may determine that the team is complete in response to player input from the first player. The game server may alternatively determine that the team is complete if the game server determines that a team formation period has expired. The game server may alternatively determine that the team is complete when the number of player entries added to the team entry reaches a predetermined maximum player limit for the team.

The method preferably comprises allowing players in the team to select a player position in the team.

Various modifications or variations of the described embodiments may be apparent to those skilled in the art without departing from the spirit and scope of the present invention and all such modifications or variations are considered to fall within the spirit and scope of the present invention.

The invention claimed is:

1. A handheld game controller for a multi-player game facilitated by a game server running a game software for the multi-player game, the game server in communication with a display system and a plurality of game controllers in proximity to the display system including the handheld game controller, the game server providing display signals for displaying a primary game display of the multi-player game on primary display means of the display system, the handheld game controller comprising:
   a controller display means;
   an input means comprising a touch-sensitive layer overlaid on the controller display means to form a touch-screen;
   a communication interface configured to communicate with the game server to enable participation in the multi-player game by a user of the handheld game controller;
   a processor configured to operate a game software module corresponding to the multi-player game, the game software module being operable by the processor to provide a secondary game display on the secondary display means, the secondary game display including a first area corresponding to a first function, and to enable a first portion of the touch-sensitive layer overlying the first area to become active to enable participation in the multi-player game by the user; and
   a memory configured to store computer program instructions comprising the game software module,
   wherein the secondary game display enabled by the game software module is complementary to the primary game display; and
   wherein the handheld game controller is configured to download the computer program instructions comprising the game software module in response to player input received via the input means requesting the game software module without requiring the multi-player came to be preselected by the user.

2. The handheld game controller of claim 1, wherein the processor is configured by the game software module to process a player input selecting the first function by touching the first portion.

3. The handheld game controller of claim 1, wherein the processor is configured by the game software module to, in response to a player input selecting the first function by touching the first portion:
provide the secondary game display including a second area corresponding to a second function, and
activate a second portion of the touch-sensitive layer overlying the second area.

4. The handheld game controller of claim 1, wherein the processor is configured by the game software module to, in response to a player input selecting the first function by touching the first portion, render the first portion of the touch-sensitive layer inactive.

5. The handheld game controller of claim 4, wherein the processor is configured by the game software module to, in response to the player input, change the first area of the secondary game display.

6. The handheld game controller of claim 1, wherein the processor is configured by the game software module to, in response to a player input selecting the first function by touching the first portion, modify the first area to correspond to a second function on the handheld game controller.

7. The handheld game controller of claim 6, wherein the processor is configured by the game software module to, in response to the player input, change the first area of the secondary game display.

8. The handheld game controller of claim 1, wherein the processor is configured by the game software module to transmit at least one packet corresponding to the first function to the game server in response to a player input selecting the first function by touching the first portion.

9. The handheld game controller of claim 1, wherein the handheld game controller is configured to receive game data from the game server, the game data corresponding to a second handheld game controller in proximity to the display system, and the processor is configured by the game software module to process the received game data to:
provide the secondary game display, the secondary game display including a second area corresponding to a second function; and
activate a second portion of the touch-sensitive layer of the input means overlying the second area to enable participation in the multi-player game.

10. The handheld game controller of claim 1, wherein the handheld game controller is configured to download the game software module from a remote server.

11. The handheld game controller of claim 1, wherein the handheld game controller is configured to download the game software module prior to initiation of the multi-player game.

12. The handheld game controller of claim 1, wherein the handheld game controller is configured to download computer program instructions comprising the game software module using a preregistered account associated with the user of the handheld game controller.

13. The handheld game controller of claim 1, wherein the handheld game controller is configured to download computer program instructions comprising the game software module in response to player input received via the input means selecting the multi-player game.

14. The handheld game controller of claim 1, wherein the handheld game controller is configured to download computer program instructions comprising the game software module in response to player input received via the input means selecting the multi-player game from amongst a plurality of multi-player games.

15. The handheld game controller of claim 1, wherein the communication interface comprises a wireless transceiver, and the handheld game controller is configured to communicate with the game server wirelessly.

16. The handheld game controller of claim 1, wherein the primary game display comprises a graphical representation of a game avatar corresponding to that handheld game controller, and the processor is configured by the game software module to generate command data in response to a player input selecting the first function by touching the first portion, and to transmit the command data to the game server to control the game avatar.

17. The handheld game controller of claim 1, wherein the processor is further configured by the game software module to provide a single-player activity on the handheld game controller.

18. A handheld game controller for a multi-player game facilitated by a game server running a game software for the multi-player game, the game server in communication with a display system and a plurality of game controllers in proximity to the display system including the handheld game controller, the game server providing display signals for displaying a primary game display of the multi-player game on primary display means of the display system, the handheld game controller comprising:
a controller display means;
an input means comprising a touch-sensitive layer overlaid on the controller display means to form a touch-screen;
a communication interface configured to communicate with the game server to enable participation in the multi-player game by a user of the handheld game controller; and
a processor configured to operate a game software module corresponding to the multi-player game, the game software module being operable by the processor to provide a secondary game display on the secondary display means, the secondary game display including a first area corresponding to a first function, and to enable a first portion of the touch-sensitive layer overlying the first area to become active to enable participation in the multi-player game by the user,
wherein the secondary game display enabled by the game software module is complementary to the primary game display;
wherein the processor is configured by the game software module to receive a packet from the game server and to generate a sensory output on the handheld game controller synchronized with a visual display shown on the primary game display using the received packet.

19. The handheld game controller of claim 17, wherein the single player activity comprises a qualification activity and the processor is configured by the game software module to communicate with the game server to indicate successful performance of the qualification activity, wherein the game server is configured to enable the handheld game controller to participate in the multi-player game in response to the indication.

* * * * *

UNITED STATES PATENT AND TRADEMARK OFFICE
CERTIFICATE OF CORRECTION

PATENT NO. : 10,272,330 B2
APPLICATION NO. : 15/662766
DATED : April 30, 2019
INVENTOR(S) : Jonathan Ira Hussman et al.

It is certified that error appears in the above-identified patent and that said Letters Patent is hereby corrected as shown below:

In the Claims

Claim 1, Column 43, Line 2:
"came to be preselected by the user."
Should read:
-- game to be preselected by the user. --

Signed and Sealed this
Eighth Day of October, 2019

Andrei Iancu
*Director of the United States Patent and Trademark Office*